United States Patent
Vaishnav et al.

(10) Patent No.: US 12,164,945 B2
(45) Date of Patent: Dec. 10, 2024

(54) METADATA DRIVEN GUIDED RULES EDITOR

(71) Applicant: Salesforce, Inc., San Francisco, CA (US)

(72) Inventors: Parth Vijay Vaishnav, San Francisco, CA (US); Mitchell Christensen, San Francisco, CA (US); Kevin Han, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 18/082,230

(22) Filed: Dec. 15, 2022

(65) Prior Publication Data

US 2024/0168781 A1    May 23, 2024

Related U.S. Application Data

(63) Continuation of application No. 17/993,751, filed on Nov. 23, 2022.

(51) Int. Cl.
*G06F 9/451* (2018.01)
*G06F 8/41* (2018.01)
*G06Q 10/067* (2023.01)

(52) U.S. Cl.
CPC .............. *G06F 9/453* (2018.02); *G06F 8/427* (2013.01); *G06Q 10/067* (2013.01)

(58) Field of Classification Search
CPC ................................ G06F 9/451; G06F 3/0482
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

Red Hat, "Red Hat JBoss BRMS 6.4 Getting Started Guide", pp. 1-32; May 13, 2019.

(Continued)

*Primary Examiner* — Di Xiao
(74) *Attorney, Agent, or Firm* — Nicholson De Vos Webster & Elliott LLP

(57) ABSTRACT

Implementation of a guided rules editor comprises displaying a view of a user interface (UI) of the guided rules editor to a user on the client device. Metadata of an organization to which the user belongs is fetched and used to identify which data of the organization is eligible for rule creation and attributes of the metadata are used to determine a layout of the one or more UI selection elements. One or more UI selection elements are rendered in one or more positions in the view on a display screen according to the layout and at least a portion of the one or more UI selection elements are populated with the data of the organization. Responsive to receiving user input of the one or more UI selection elements, an organization-specific rule is generated and saved to a data repository for execution by a rules engine after rule compilation.

9 Claims, 17 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,451,393 B1 | 11/2008 | Herbison et al. |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,316,309 B2 | 11/2012 | Bartek et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,655,301 B2 | 10/2013 | Jakobson |
| 8,646,103 B2 | 2/2014 | Jakobson et al. |
| 9,563,422 B2 | 2/2017 | Cragun et al. |
| 9,740,743 B2 | 8/2017 | Jagota et al. |
| 9,817,677 B2 | 11/2017 | Pessoa et al. |
| 9,852,382 B2 | 12/2017 | Rangaswamy et al. |
| 9,946,710 B2 | 4/2018 | Yamaguchi |
| 10,152,497 B2 | 12/2018 | Doan et al. |
| 10,185,925 B2 | 1/2019 | Bai et al. |
| 10,235,476 B2 | 3/2019 | Vaishnav et al. |
| 10,237,336 B2 | 3/2019 | Dvinov et al. |
| 10,304,021 B2 | 5/2019 | Soloway |
| 10,387,388 B2 | 8/2019 | Doan et al. |
| 10,466,868 B2 | 11/2019 | Boucher et al. |
| 10,681,133 B2 | 6/2020 | Puleston et al. |
| 10,733,613 B2 | 8/2020 | Vaishnav et al. |
| 10,802,660 B1 | 10/2020 | Krivopaltsev et al. |
| 10,901,996 B2 | 1/2021 | Doan et al. |
| 10,949,395 B2 | 3/2021 | Doan et al. |
| 11,138,222 B2 | 10/2021 | Semlani et al. |
| 11,244,238 B2 | 2/2022 | Jagota et al. |
| 11,256,690 B2 | 2/2022 | Dvinov et al. |
| 11,310,366 B1 * | 4/2022 | Dhandapani ......... G06Q 30/016 |
| 11,361,268 B1 * | 6/2022 | Fisher ............... G06Q 10/0637 |
| 11,442,989 B2 | 9/2022 | Dvinov et al. |
| 11,748,320 B2 | 9/2023 | Hersans et al. |
| 11,790,414 B2 | 10/2023 | Christensen et al. |
| 11,798,044 B2 | 10/2023 | Christensen et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |

(56) References Cited

U.S. PATENT DOCUMENTS

| | | | |
|---|---|---|---|
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0184585 A1 | 10/2003 | Lin et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0103364 A1 | 5/2004 | Dornback | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0160065 A1 | 7/2005 | Seeman | |
| 2006/0122961 A1 | 6/2006 | Kalia et al. | |
| 2006/0253830 A1 | 11/2006 | Rajanala et al. | |
| 2007/0150820 A1 | 6/2007 | Salvo | |
| 2008/0208785 A1 | 8/2008 | Trefler et al. | |
| 2008/0249972 A1 | 10/2008 | Dillon | |
| 2008/0275829 A1 | 11/2008 | Stull et al. | |
| 2009/0063415 A1 | 3/2009 | Chatfield et al. | |
| 2009/0100342 A1 | 4/2009 | Jakobson | |
| 2009/0150411 A1 | 6/2009 | Laaser et al. | |
| 2009/0177744 A1 | 7/2009 | Marlow et al. | |
| 2011/0099494 A1 | 4/2011 | Yan et al. | |
| 2011/0185294 A1 | 7/2011 | Binder et al. | |
| 2011/0218958 A1 | 9/2011 | Warshavsky | |
| 2011/0247051 A1 | 10/2011 | Bulumulla | |
| 2012/0005592 A1 | 1/2012 | Shrinivas | |
| 2012/0016713 A1* | 1/2012 | Wilcock | G06F 9/5038 705/348 |
| 2012/0042218 A1 | 2/2012 | Cinarkaya | |
| 2012/0191865 A1 | 7/2012 | Duff et al. | |
| 2012/0233137 A1 | 9/2012 | Jakobson et al. | |
| 2012/0254090 A1 | 10/2012 | Burris et al. | |
| 2012/0290407 A1 | 11/2012 | Hubbard et al. | |
| 2013/0138425 A1 | 5/2013 | Luke | |
| 2013/0179772 A1 | 7/2013 | Nakamura | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0279405 A1* | 9/2014 | Darnieder | G06Q 50/16 705/38 |
| 2014/0359537 A1 | 12/2014 | Jackobson et al. | |
| 2017/0293629 A1 | 10/2017 | Doan et al. | |
| 2018/0025038 A1 | 1/2018 | Semlani et al. | |
| 2018/0039667 A1 | 2/2018 | Pierce et al. | |
| 2018/0096003 A1 | 4/2018 | Vaishnav et al. | |
| 2018/0129686 A1 | 5/2018 | Vaishnav | |
| 2018/0183671 A1 | 6/2018 | Dvinov et al. | |
| 2018/0189792 A1* | 7/2018 | Vaishnav | G06F 16/215 |
| 2019/0236184 A1 | 8/2019 | Dvinov et al. | |
| 2019/0370363 A1 | 12/2019 | Hersans et al. | |
| 2020/0311267 A1 | 10/2020 | Klonowski et al. | |
| 2021/0191934 A1 | 6/2021 | Xiao et al. | |
| 2021/0216591 A1 | 7/2021 | Dvinov et al. | |
| 2021/0241300 A1 | 8/2021 | Vaishnav et al. | |
| 2021/0241301 A1 | 8/2021 | Christensen et al. | |
| 2021/0241328 A1 | 8/2021 | Christensen et al. | |
| 2021/0241329 A1 | 8/2021 | Christensen et al. | |
| 2021/0241330 A1 | 8/2021 | Vaishnav et al. | |
| 2021/0326311 A1 | 10/2021 | Ker et al. | |
| 2021/0406936 A1 | 12/2021 | Christensen et al. | |
| 2022/0182491 A1* | 6/2022 | Powers | H04W 12/069 |
| 2022/0283996 A1* | 9/2022 | Lecaillon | G06F 16/215 |
| 2022/0350447 A1 | 11/2022 | Sreenivasachar et al. | |
| 2023/0065223 A1* | 3/2023 | Penneru | G06F 3/167 |
| 2023/0113783 A1* | 4/2023 | Le | G06F 8/51 717/137 |
| 2023/0214680 A1 | 7/2023 | Bernelas et al. | |
| 2023/0260307 A1 | 8/2023 | Reisman | |
| 2024/0054149 A1 | 2/2024 | Karanth et al. | |
| 2024/0095788 A1 | 3/2024 | Vaishnav et al. | |
| 2024/0095789 A1 | 3/2024 | Vaishnav et al. | |
| 2024/0168780 A1 | 5/2024 | Vaishnav et al. | |
| 2024/0168957 A1 | 5/2024 | Vaishnav et al. | |
| 2024/0169219 A1 | 5/2024 | Vaishnav et al. | |
| 2024/0169299 A1 | 5/2024 | Vaishnav et al. | |

OTHER PUBLICATIONS

Red Hat Jboss BRMS 6.4, The User Guide for Red Hat JBoss BRMS, 2019 Red Hat, Inc https://access.redhat.com/documentation/en-us/red_hat_jboss_brms/6.4/html/user_guide/index.

Non-Final Rejection, U.S. Appl. No. 18/082,200, Aug. 30, 2023, 29 pages.

Non-Final Office Action, U.S. Appl. No. 17/993,751, Mar. 1, 2024, 10 pages.

Notice of Allowance, U.S. Appl. No. 18/082,200, Feb. 20, 2024, 11 pages.

Notice of Allowance, U.S. Appl. No. 17/993,751, Jul. 3, 2024, 7 pages.

Notice of Allowance, U.S. Appl. No. 18/082,200, Jul. 3, 2024, 5 pages.

* cited by examiner

320 sObjects/SalesTransaction/describe

- actionOverrides
- activateable: false
- associateEntityType: null
- associateParentEntity: null
- childRelationships
- compactLayoutable: false
- createable: false
- custom: false
- customSetting: false
- deepCloneable: false
- defaultImplementation: null
- deletable: false
- deprecatedAndHidden: false
- extendedBy: null
- extendsInterfaces: null
- feedEnabled: false
- fields
- hasSubtypes: false
- implementedBy: Order
- implementsInterfaces: null
- isInterface: true
- isSubtype: false
- keyPrefix: 0dA
- label: Sales Transaction
- labelPlural: Sales Transaction
- layoutable: false
- listviewable: null
- lookupLayoutable: null
- mergeable: false
- mruEnabled: false
- name: SalesTransaction

| Rules Management | | | | 420 |
|---|---|---|---|---|
| Guided Rules Editor | | | New | Complie |
| Name | Ready for Deplyment | Rule Type | Template Source ▼ | |
| Price Multiplier | √ | Rule | | |
| Support | √ | Template | | |

FIG. 4D

Identifying, by an API that is communicatively coupled with a rules engine, a plurality of rules, wherein respective rules of the plurality of rules are associated with at least one rule characteristic of a plurality of rule characteristics
1205

Identifying, by the API, one or more characteristics of a process request received from a customer, wherein the process request relates to a process that is to be executed based on one or more rules of the plurality of rules
1210

Identifying, by the API based on correlation of the one or more characteristics of the request with the plurality of rule characteristics, a subset of the plurality of rules, wherein the subset is less than the plurality of rules
1215

Providing, by the API, one or more indications of rules in the subset of the plurality of rules to the rules engine
1220

Executing, by the rules engine, the process based on the subset of the plurality of rules
1225

Figure 12

METADATA DRIVEN GUIDED RULES EDITOR

CLAIM OF PRIORITY

The present application is a continuation application of U.S. patent application Ser. No. 17/993,751, filed Nov. 23, 2022, which is herein incorporated by reference in its entirety.

TECHNICAL FIELD

One or more implementations relate to the field of rules engines; and more specifically, to metadata driven guided rules editor.

BACKGROUND ART

A business rules engine is a software system that executes one or more business rules in a runtime production environment. Each rule comprises a set of the conditions followed by the set of actions. Any "if-then" statement that appears in traditional business logic may qualify as a business rule. The rules represent logic of represented from, for example, company policies, legal regulation, or other sources. A business rule system enables these company policies and other operational decisions to be defined, tested, executed and maintained separately from application code. Rule engine software is commonly provided as a component of a business rule management system, which may provide the ability to register, define, classify, and manage all the rules, verify consistency of rules definitions, define the relationships between different rules.

Given a rule engine and a rule language such as Drools (DRL), a user in an organization can write any rule, but conventional rule engine tools allow users to create rules that will end up being invalidated either at compile or run time because the tools do not determine if the rule is valid for the type of data used within the organization. For example, there are conventional guided rule editors to help users create and edit rules. The conventional guided rule editors may display options that enables the user to set attributes during rule creation. For example, it may be possible for the user to limit field values to items selected from a pre-configured list displayed via a drop down list. However, the range of field values may include values that make the rule invalid based on other aspects of the rule. In addition, conventional guided rule editors may also display text fields that enable the user to enter free form text as part of the rule. As such, users of the rule engine may spend significant time and expense creating rules that have mistakes, which also results in invalidated rules.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3B is a diagram illustrating an example of fetching the organization metadata relevant to the selected domain based on the metadata service making a metadata call to a data dictionary.

FIGS. 4A-4D are diagrams illustrating example rule pages displayed by the guided rules editor.

FIG. 12 depicts an example of a technique by which a process may be executed based on a subset of a plurality of rules.

DETAILED DESCRIPTION

Guided Rules Editor

The following description describes implementations for an improved process and architecture for a metadata driven guided rules editor. The described subject matter can be implemented in the context of any cloud-based computing environment including, for example, a multi-tenant database system.

Figure 1:
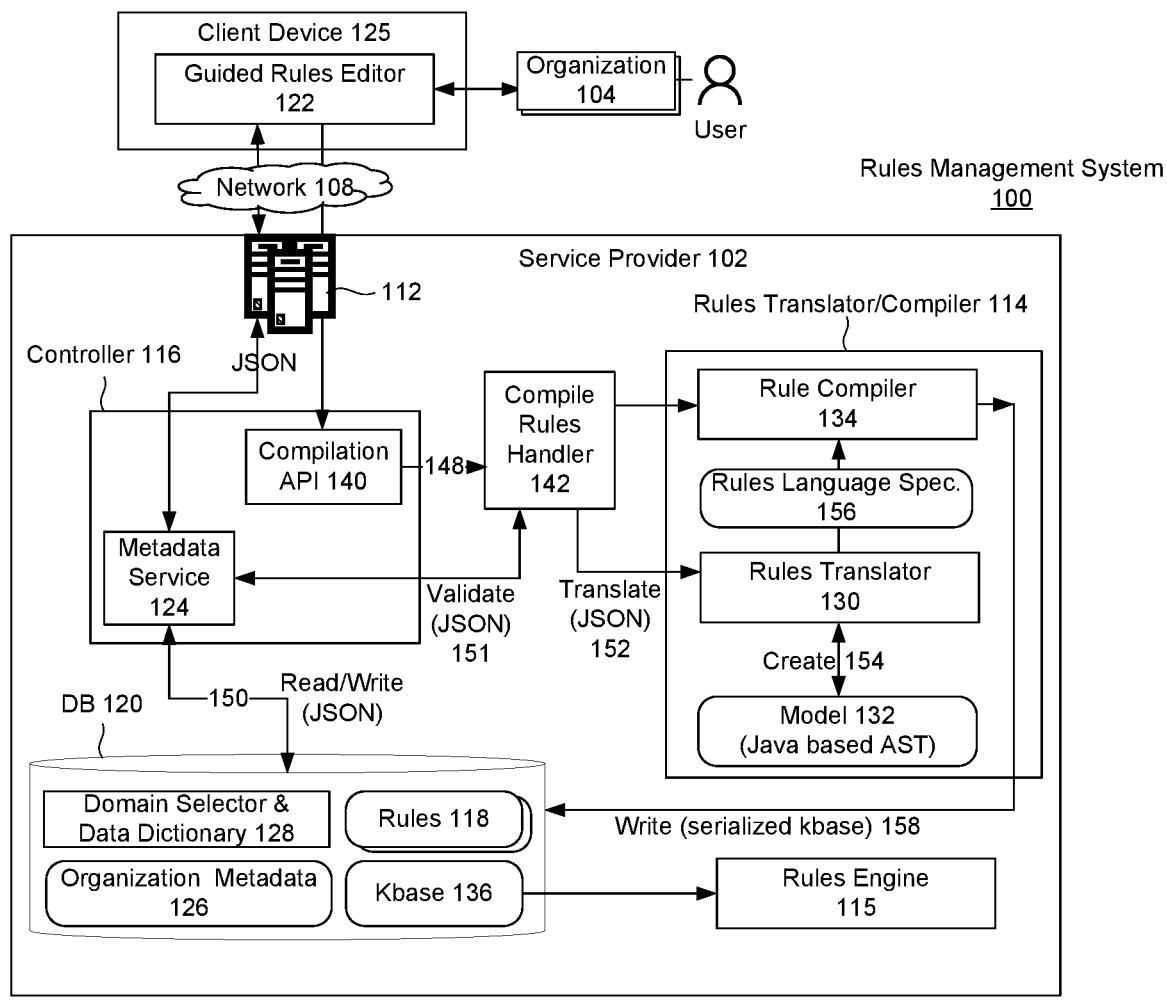
FIG. 1 illustrates a business rule system according to one example implementation.

For context, FIG. 1 illustrates a rules management system according to one example implementation. The rules management system 100 comprises a service provider 102 that provides software services to one or more organizations 104 over a network 108 through compute resources 112. In one example implementation, the service provider 102 may provide customer relationship management (CRM) services that enable organizations 104 to manage the relationships and interactions with customers. Additionally or alternatively, the service provider 102 may be implemented a software-as-a-service (SAAS), a platform-as-a-service (PAAS), or an infrastructure-as-a-service (IAAS). In another implementation, the service provider 102 may be provided by a cloud service provider that delivers computing resources over the Internet. Example cloud service providers include Amazon Web Services (AWS)™, Microsoft Azure™, and Google Cloud Platform (GCP), and IBM Bluemix™. The compute resources 112 may include servers, databases, storage, analytics, networking, software and intelligence.

The rules management system 100 may comprise a set of software services that enable users to create and execute one or more business rules 118 from the database 120 in a runtime production environment to automate complex decision-making. The rules management system 100 enables policies and other operational decisions of particular to each organization 104 to be defined, tested, executed and maintained. The rules management system 100 typically support rules, facts, priority (score), mutual exclusion, preconditions, and other functions. Within the service provider 102, the rules management system 100 includes a rules translator/compiler 114, a rules engine 115, a controller 116, and one or more databases 120. The rules translator/compiler 114 may comprise a rules translator 130 and a rules compiler 134, which are responsible for translating and compiling rules created by the user into executable rules that are stored in a database (e.g., DB 120). During runtime, the rules engine 115 loads and fires off the executable rules.

Typically, customer organizations interact with a rules system by manually writing rules in a given rule language specification (e.g., Drools Rule Language (DRL). The customer organizations that build rules, however, have very different use-cases and some may belong to different industries, resulting in significant differences in metadata between organizations. Because of this, a rule that the rules engine may validate for one organization will not necessarily be validated for another organization. In addition, requiring a user to manually write rules may result in many rule validation errors. Conventional guided rules editors are an improvement over manually written rules, but guided rules editors typically have free-form fields into which the user types data. Consequently, conventional guided rules editors may not significantly reduce the rate of validation errors over manually written rules.

According to disclosed implementations, the system 100 improves over conventional guided rule editors by serving on client devices 125 a guided rules editor 122 that is driven by organization metadata 126 (and associated data). The system provider 102 makes the organization metadata 126 accessible to the guided rules editor 122 by implementing an abstraction layer within the controller 116 called a metadata service 124 between the guided rules editor 122 and both the database 120 and the rules translator/compiler 114.

The guided rules editor 122 presents the user with a dynamic input form that allows the user to create new rules and/or modify existing rules 118 using a point-and-click interaction model. Through the metadata service 124, parts of the rules are automatically populated by the organization metadata 126 and data owned by the organization 104 of the user/rule author. Populating rules with the organization metadata 126 scopes down the data that is displayed by the guided rules editor 122 and selected by the user during rule creation/modification, significantly reducing the amount of validation errors.

In one implementation, the guided rules editor 122 is a web-based application hosted by the service provider 102 and displayed over the network 108 on the client device 125. Additionally or alternatively, the guided rules editor 122 may be implemented as a downloaded executable run on the client device 125.

In some such implementations, the service provider 102 includes application servers configured to implement and execute software applications as well as provide related data, code, forms, renderable web pages and documents and other information to and from client device 125 and to store to, and retrieve from, a database system related data, objects, and Web page content.

The service provider 102 can provide multi-tenant access to multiple hosted (standard and custom) applications, including the guided rules editor 122, through network 108 to the client device 125. The term "server" is meant to refer to a computing device or system, including processing hardware and process space(s), an associated storage medium such as a memory device or database, and, in some instances, a database application (for example, OODBMS or RDBMS) as is well known in the art. Similarly, the database 120 can be implemented as a single database, a distributed database, a collection of distributed databases, a database with redundant online or offline backups or other redundancies, etc., and can include a distributed database or storage network and associated processing intelligence.

The network 108 can be or include any network or combination of networks of systems or devices that communicate with one another. For example, the network 108 can be or include any one or any combination of a LAN (local area network), WAN (wide area network), wireless network, cellular network, point-to-point network, star network, or other appropriate configuration. The network 108 can include a TCP/IP (Transfer Control Protocol and Internet Protocol) network, such as the global internetwork of networks often referred to as the "Internet".

The client device 125 can communicate with service provider 102 using TCP/IP and, at a higher network level, other common Internet protocols to communicate, such as HTTP, FTP, AFS, WAP, etc. In an example where HTTP is used, the client device 125 can include an HTTP client commonly referred to as a "web browser" or simply a "browser" for sending and receiving HTTP signals to and from an HTTP server of the service provider 102. In some implementations, the compute resources 112 may include a network interface 108 between the service provider 102 and the network 108 having load sharing functionality, such as round-robin HTTP request distributors to balance loads and distribute incoming HTTP requests evenly over a number of servers. In some implementations, each of the servers can have access to the stored data; however, other alternative configurations may be used instead.

Figure 2:
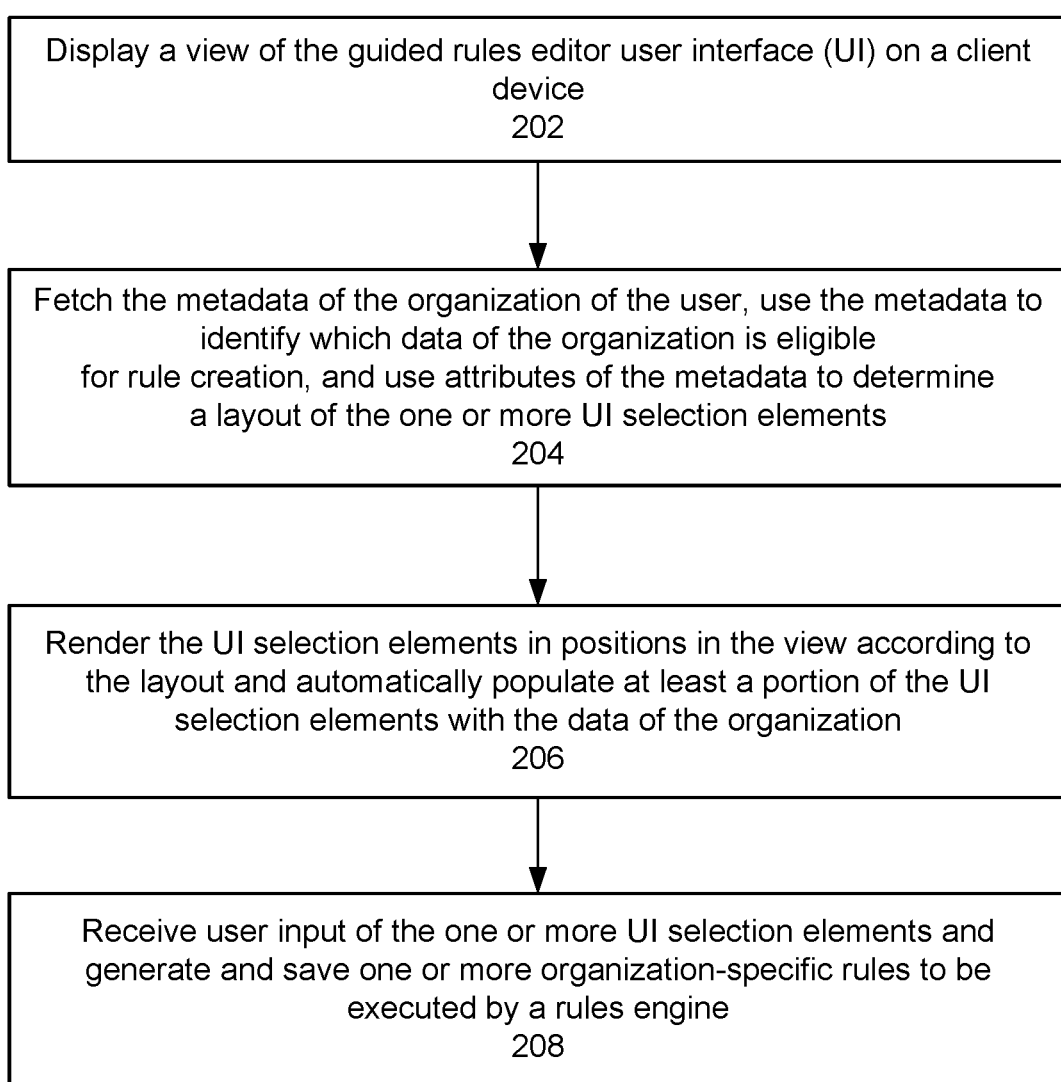
FIG. 2 is flow diagram illustrating the process performed by the metadata driven guided rules editor and a controller.

FIG. 2 is flow diagram illustrating the process 200 performed by the metadata driven guided rules editor and the controller. The process may begin by displaying a view of a user interface (UI) of the guided rules editor to a user on the client device 125 (block 202).

The metadata service 124 fetches the metadata of an organization to which the user belongs, uses the metadata to identify which data of the organization is eligible for rule creation and uses attributes of the metadata to determine a layout of the one or more UI selection elements (block 204). In one implementation, the metadata service fetches the metadata of the organization based on the login credentials of the user and/or user account information.

The one or more UI selection elements are rendered in one or more positions in the view according to the layout and at least a portion of the one or more UI selection elements are automatically populated with the data of the organization (block 206). The guided rules editor 122 is configured as a drag and drop application in which components of the user interface (UI) are arranged in desired positions within the view. The guided rules editor 122 allows the user to create rules 118 visually with pre-built UI elements such as forms, tables, lists, maps views, buttons, etc. on a display screen. Rules are created by the user selecting various combinations of expression set elements, where each element in a set from a logical step that runs sequentially.

Responsive to receiving user input of the one or more UI selection elements, one or more organization-specific rules to be executed by the rules engine are generated and saved to a data repository for subsequent rule compilation (e.g., database 120) (block 208). The guided rules editor 122 enables the user to incrementally create rules, and load and save existing rules.

Referring again to FIG. 1, the rule generation process performed by the system 100 is shown. As described above, the user first interacts with the guided rules editor 122 as a rule author to create rules 118 using the metadata driven point-and-click UI. As the rule author defines rules, a document structure file, e.g., a JSON (JavaScript Object Notation file) is created representing the structure of the organization-specific rule. The controller 116 or the metadata service 124 stores the document structure file in the database 120 (line 150). In one implementation, the document structure file is persisted to the database 120 as a binary file (e.g., a StringPlusCLOB or BLOB field).

Once the rule author has defined one or more rules, graphical representations of the rules is translated into a specific rule syntax required by the underlying rules engine 115. When the users ready to test/deploy the set of rules, the user clicks a "Compile" or "Deploy" button in the UI of the guided rules editor 122. Responsive to the user clicking on "compile" in the UI of the guided rules editor 122 and selects the set of rules, the compilation API 140 is invoked and emits a "compile rules event" that is received by the compile rules handler 140 (via line 148). The compile rules handler 142 then calls the metadata service 124 to perform syntactical validations on syntax in the rule, and logic-specific validations on certain rule statements based on the organization metadata 126 via line 151. After the metadata service 124 signals a successful validation, the compile rules handler 142 calls the rules translator 130 for rule translation (via line 152).

Rule translation is the process of translating the organization-specific rules defined in the document structure into general-purpose rules and validated syntax according to the rules language specification (e.g., DRL). To accomplish this, the rules translator 130 deserializes the JSON document (i.e., converts strings in the JSON into objects) and creates a model (line 154), such as Java-based abstract syntax tree (AST) or just syntax tree 132. The AST or syntax tree 132 is a tree representation of the abstract syntactic structure of text that will become the final rules language specification, where each node of the tree denotes an element of a rule to be generated from the text of the JSON document.

The rules translator 130 generates the rules language specification 156 required by the rules engine 115 by converting the AST 132. In some implementations, the rules translator 130 may use a template engine (not shown) to convert the AST into the rules language specification 156. At runtime, the template engine replaces variables in a template file with actual values, and transforms the template into the rules language specification 156. The rules language specification is then passed to a rule compiler 134.

Through the UI of the guided rules editor 122, the user can compile(/deploy) rules, and publish an event that triggers rule compilation. For example, responsive to the user clicking a "Compile" UI element in the guided rules editor 122, the guided rules editor 122 may send a message with a compile request through compilation API 140 to a compile rules handler 142 outside of the rules engine 115. The rule compiler 134 takes the rules language specification 156 as input and generates compiled rules, serializes the compiled rules into a serialized knowledgebase (kbase) 136, and writes the kbase 136 to the database 120 (line 158). In one implementation, the kbase 136 may be stored in a binary large object (BLOB) field of the organization 104 for execution at runtime.

On completion of compilation, an event is electronically sent to the user. For example, the UI may indicate whether a rule has been compiled and deployed for subsequent rule execution. Additionally or alternatively, the controller 116 or another component may generate and send an email notification to the user when compilation is complete.

Figure 3A:
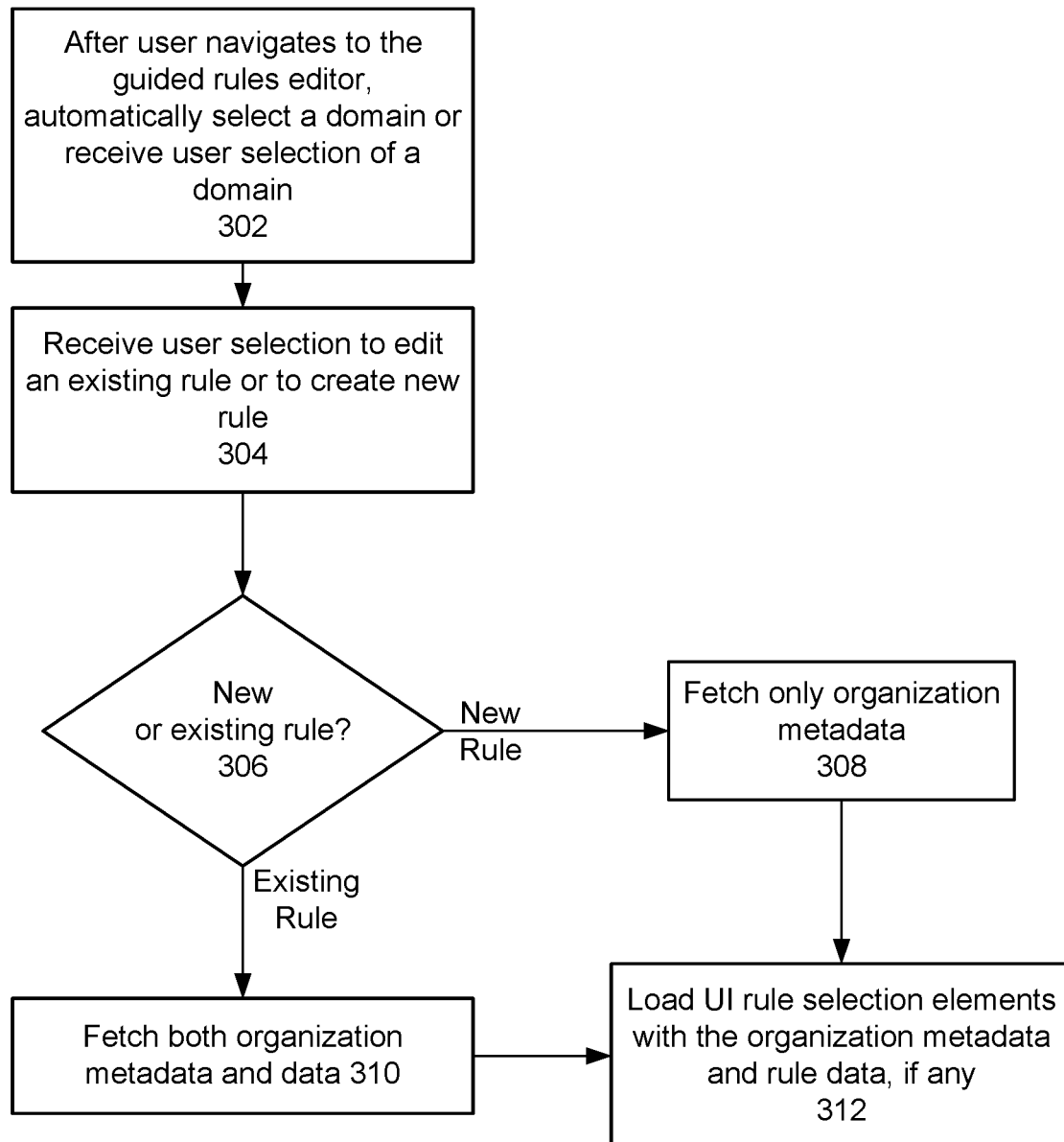
FIG. 3A is a flow diagram illustrating the metadata-driven process of the guided rule editor to limit the information the user can input into a rule.

FIG. 3A is a flow diagram illustrating the metadata-driven process of the guided rules editor 122 to limit the information the user can input into a rule. In one implementation, the user may optionally select a particular domain to which the rules 118 pertain. A domain may be a distinct subset of the Internet with IP addresses sharing a common suffix (e.g., "salesforce.com") or under the control of a particular organization or individual. Sometimes the domains may be associated with specific business units of the organization. Example types of business domains may include Pricing Rules that control the price of a transaction, Product Rules that control how products can be sold or bundled, Tax Rules that determine which taxes apply to a transaction, Validation Rules that exist to validate a transaction.

Responsive to the user navigating of the guided rules editor (e.g., via a URL), the guided rules editor may automatically select a domain to which the rules pertain based on the credentials of the user, or receives a selection of a domain from a plurality of displayed domains by the user in the UI (block 302). For example, in the case where the user's organization includes multiple domains, the guided rules editor 122 may display a page with UI elements for each of the domains. The user may then click on one of the domains to create/edit rules for that domain.

Once in the page for the domain, the guided rules editor 122 receives a user selection to edit an existing rule or to create anew rule (block 304). The guided rules editor 122 determines whether the user selected a new rule for an existing rule based on UI input (block 306). Responsive to the user selecting a new rule, the guided rules editor 122 sends a request to the metadata service 124 to fetch only the organization metadata 126 eligible to be made into rules (block 308). The metadata service 124 may use a domain selector and data dictionary 128 to retrieve the organization metadata 126 relevant to the selected domain and return the organization metadata 126 to the guided rules editor 122.

More specifically, the metadata may be used to set a domain for specific languages (e.g., nouns and verbs) to be used for different business or application domains. Such business or application domains may be, for example, Product Validation/Selection (visibility)/Pricing, Transaction Management, Tax Treatment, Asset Management, Revenue Recognition, etc. Additionally or alternatively, the business or application domains may relate to a specific organization (e.g., requests that come from an IP address that shares a common suffix), a type of organization (e.g., private, corporate, government, military, non-profit, etc.). It will be understood that these examples are described here as a non-exhaustive list for the sake of discussion, and domains may relate to additional or alternative criteria in other implementations.

As noted, the defined nouns (e.g., names, objects, etc.) and verbs (e.g., actions) may be specific to a given business or application domain, and may be considered to be unrelated to the specific syntax or elements of the underlying language(s) or AST(s) used by the rules engine 115.

In one example, for the pricing domain, such nouns may be "quotes," "carts," "orders," "discounts," "promotions," "products," etc. The associated verbs may include "apply discount," "calculate line item totals," "lookup starting unit price," "apply promotion," etc.

As another example, for the revenue recognition domain, such nouns may include "invoice," "payment," "general ledge," "revenue," "legal entity," etc. The associated verbs may include "recognize revenue," "defer revenue," "accrue revenue," etc.

Similarly to the descriptions of the business domains, the descriptions of such nouns and verbs are intended for the sake of discussion and non-limiting examples. In other implementations, the listed business domains may have more, fewer, or different nouns and/or verbs. Examples of the usage of such nouns and verbs are depicted and described below with respect to FIGS. 4B and 4C (as well as elsewhere within this document).

As a result of such nouns and verbs, particularly when used in a guided rules editor such as guided rules editor 122, a business user or analyst that is untrained in writing rules in a programming language may still efficiently generate various business-related rules. This ability to generate one or more business-related rules may be beneficial because it may eliminate the need for a business analyst to communicate with a developer, which may result in quicker rule development, fewer errors due to human misunderstandings, or other benefits.

As one specific example, if the business analyst (or some other rule author) wishes to apply a discount, the underlying system may use an object such as PriceAdjustItem that needs to be created, populated with details of the discount, and then associated with a given cart/quote line item. However, using the domain-specific metadata above, the business analyst may be able to generate a rule (for example, through plaintext or through the use of the guided rules editor) such as "Apply a 10% discount to the current line item." In this situation, verbs such as "apply" or "to" and a noun such as "10% discount" and "current line item" may be related to the business domain and used to generate such a rule.

FIG. 3B is a diagram illustrating an example of fetching the organization metadata 126 relevant to the selected domain based on the metadata service 124 making a metadata call to the data dictionary 128 (FIG. 1) to retrieve a single object 320 for display in the guided rules editor 122. In other implementations, the metadata call may request metadata for multiple objects at once. In the current example, the data dictionary 128 returns metadata describing a sales transaction object.

Top-level metadata for the sales transaction object includes action overrides, child relationships, fields, names layout information, record type information, and the like. The action overrides describe a list of standard and non-standard actions (e.g., operations such as create, update, delete, clone, etc.) available on the object. The child relationships describe a list of objects that have a reference to the current object (either as a parent or a reference). The fields describe which pieces of data are stored within each record for this object (similar to database columns).

The guided rules editor 122 may display the UI selections elements that control the creation of the rule based on the metadata defined in the data dictionary 128. For example, assume the user selects a top-level object in the UI. The available list of child relationship entities to display for user selection is then limited to the ones defined in the metadata. Similarly, if the user adds a filter on a field value based on a particular object, the UI will only show fields that belong to that object. Furthermore, the type of that field is limited in the UI input as well (e.g. selecting a field of type Date will pop up a Datepicker in the UI, selecting a picklist field will pop up a dropdown list with valid picklist values, and the like).

Referring again to FIG. 3A, responsive to the user selecting an existing rule (block 306), the guided rules editor 122 sends a request to the metadata service 124 to fetch both the organization metadata 126 and associated data (block 310). In this step, the metadata service 124 may use the organization metadata 126 to identify which data of the organization 104 is eligible for rule creation, and uses attributes of the organization metadata 126 to determine a layout of the one or more UI selection elements displayed by the guided rules editor 122.

The guided rules editor 122 then loads UI rule selection elements with the organization metadata 126 and the rule data if any (block 312). Loading the UI rule selection elements with the organization metadata and rule data that are eligible to be made into rules ensures that when the user actually creates/modifies rules, the user is unlikely to create a rule having validation mistakes. With this approach, the user is limited to how rules are created and what the rules contain. For example, the user can write a rule concerning the existence of an object or a field inside a transaction, but the guided rules editor 122 limits the choice of what objects and fields can be added to transaction rules.

Figure 4A:
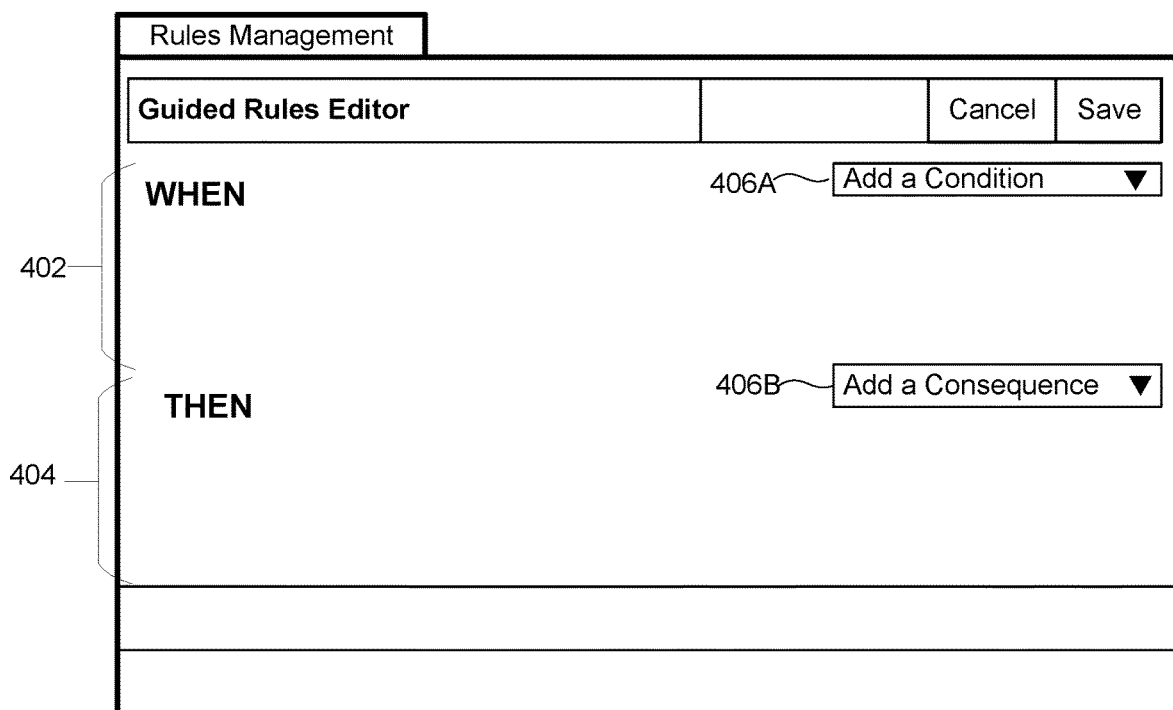
Figure 4B:
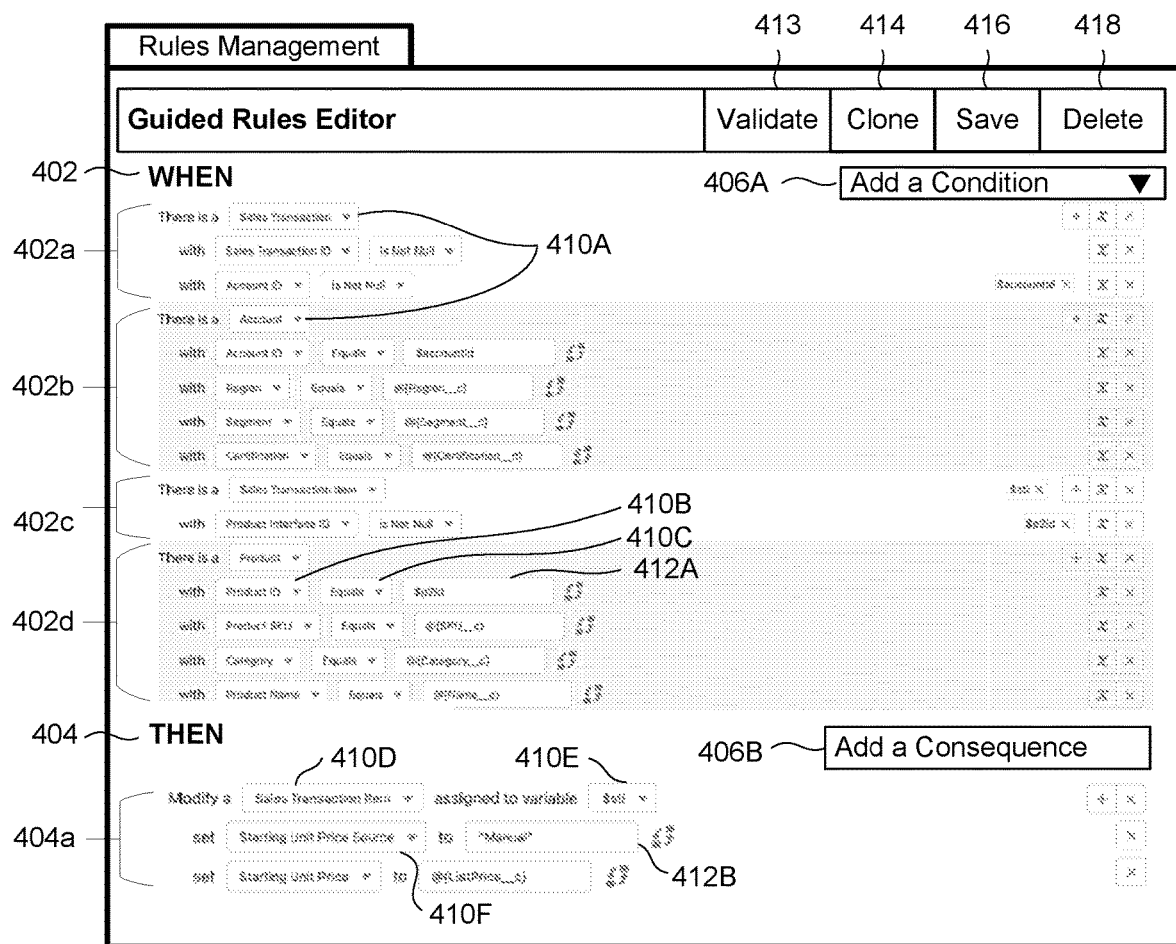
Figure 4C:
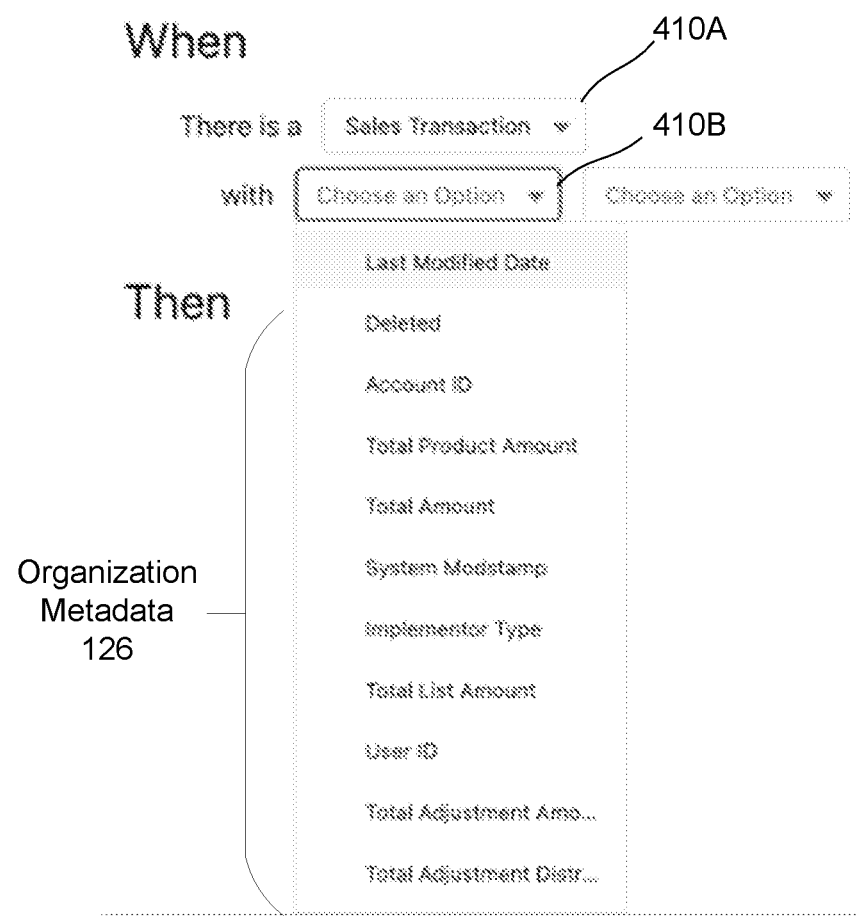

FIGS. 4A-4C are diagrams illustrating example rule pages 400A and 400B displayed by the guided rules editor. FIG. 4A illustrates rule page 400A, which is displayed when the user chooses to create a new rule. In one implementation, the user is limited to creating/editing rules using only point-and-click and drop down selections with no free-form fields to be completed by the user. The limitations are manifested as UI selection elements 406A and 406B and 410A-410F in FIG. 4B (e.g., drop downs, buttons, etc.) that are automatically populated from the metadata, which inherently limits the user to what is available for selection. Notice the absence of any UI elements that require the user to select from sets of metadata to load.

Referring to FIG. 4A, since the user chose to create a new rule, there is no data to display for the rule, so only a "When" condition section 402 and a "Then" consequence section 404 of the rule are shown. The "When" condition section 402 of the rule is a condition that must be met, while the "Then" consequence section 404 describes an action or consequence to be performed when the condition in the rule has been met. According to the disclosed implementation, the guided rules editor automatically loads the organization metadata for selection by the user when the user clicks "Add a Condition" or "Add a Consequence" UI selection elements 406A and 406B, respectively.

FIG. 4B illustrates page 400B, which is displayed when the user chooses to edit an existing rule. In the existing rules page 400B, the guided rules editor displays a view of the rule in which both the organization metadata, as well as the data, for the rule are loaded in the UI selection elements 410A and 410B (collectively referred to as UI selection elements 410). In some implementations, the UI selection elements 410 include a carat element that can clicked by the user to display a hidden list of organization metadata or operators for user selection to limit what data is available to the user for selection (contrasted to, for example, a free text input).

FIG. 4C is a diagram illustrating an example pull-down list of auto populated organization metadata 126 for user selection within UI selection element 410B.

Referring again to FIG. 4B, the "When" condition section 402 of the example rule includes one or more When conditions 402a-402d, each of which defines a condition of the rule that must be met. Each When condition 402a-402d includes a "There is a" phrase followed by a UI selection element 410A that enables the user to select an organization metadata object (e.g., a "sales transaction", "region", etc.).

Each "There is a" phrase is followed by a "With" clause indicating conditions that must be met. Each "With" clause comprises i) a UI selection element 410B that enables to the use to select organization metadata attributes (e.g., Product ID); ii) a UI selection element 410C that enable the user to select mathematical operators (e.g., "equal", "is not null", and the like); and iii) an auto-populated data field 412 that is automatically filled with a value from the organization data (e.g., $P2ID) associated with the selected organization metadata attribute.

Notice that auto-populated data field 412 does not include a carat indicating selectable metadata, but instead is auto-populated with the variable name of data. In one implementation, attributes shown with leading and trailing special characters (e.g., "$", "@") may indicate rule template variables (e.g., $accountid) that are required when defining a variable within a rule template, where the value of the variable will be automatically retrieved and loaded into to the rule at runtime.

The "Then" condition section 404 of the example rule is performed when the When conditions 402a-402d are met. The "Then" condition section 404 includes one or more Modify consequences 404a, each of which includes a "Modify a" phrase, followed by a UI selection element 410D for selection of an organization metadata object, and a UI selection element 410E for selection of a variable name. Each "Modify a" phrase includes one or more "Set" clauses used to define a consequence. Each "Set" clause includes UI selection element 410F for selection of an object and an auto populated data field 412B containing a value to which the object will be set to. The guided rules editor may also support other actions, such as "Insert" and "Delete", and domain specific actions such as "Apply Discount" and "Notify User".

The column of X's along the side of the UI allows the user to assign value of a current row to a variable, and allows the reference of this variable elsewhere in the rule. For example, assume a current row matches against the ID of an Account object. Users can click the X to assign this row to a variable named $accId. Elsewhere in the rule, the user can use $accId to automatically obtain the Account ID.

The existing rules page 400B may also include UI elements for the user to Validate 413, Clone (copy) 414, Save 416, and Delete 418 the rule. Validate 413 causes the single rule displayed to be verified, Clone 414 causes the rule to be cloned or copied, Save 416 saves the rule, and Delete 418 deletes the rule.

FIG. 4D illustrates page 400D, which is displayed when the user chooses to compile or deploy a set of rules. Page 400D displays multiple deployable/verified (i.e., "validated") rules and that are compiled together into a single Kbase 136 in response to the user clicking a UI element to Compile 420 the rules. The UI may indicate the rule type, e.g., a rule or a rule template, and for rule templates, the template source via a pull down UI element.

Thus, the UI selection elements 410A-410F and auto populated data fields 412A and 412B are rendered in one or more positions in the view according to a layout, and at least a portion of the UI selection elements are populated with the metadata and data of the organization. In some implementations, some of the UI selection elements 410A-410C and auto populated data field 412A may be shown or not depending on what organization metadata 126 is returned and made available for inclusion into the rule. For example, while the number of the "There is a" phrases is controlled the user by adding conditions using UI selection element 406A, the number of "With" clauses may depend on the number of organization metadata attributes that are associated with the selected organization metadata object in the "There is a" phrase.

The guided rules editor 122 ensures the user creates valid rules without manually specifying or pre-configuring metadata files for ingestion by the rules system. For example, a user may write a rule concerning the existence of an object or a field inside a transaction, the user's choice of which objects and fields to choose is limited to what currently exists in their organizations based on their metadata, which is automatically loaded during rule creation. One advantage of the disclosed embodiments is the reduction of potential mistakes a user can make while writing rules, since the user is much more likely to write valid rules through limitations imposed on the data used for input.

Figure 5:
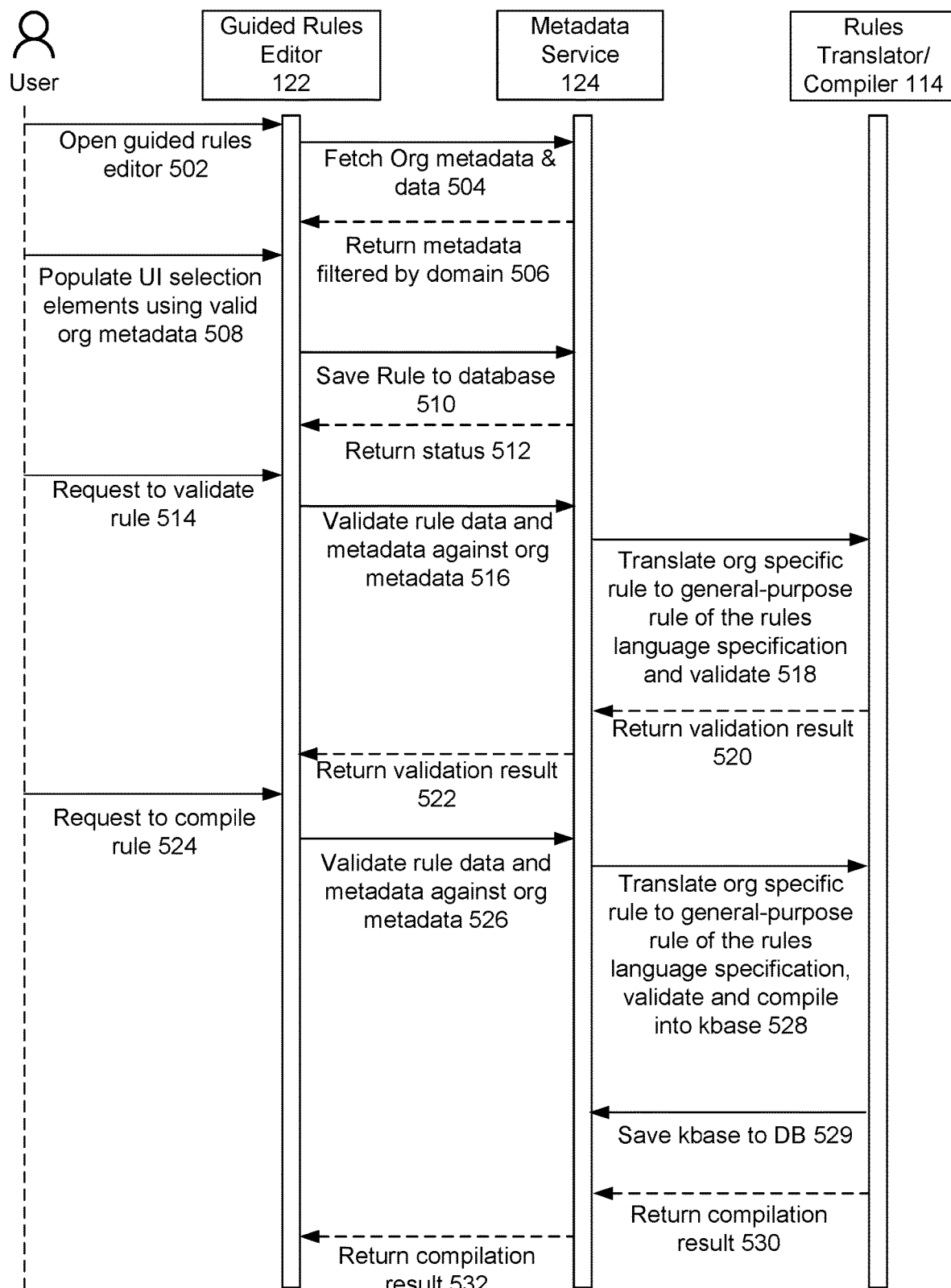
FIG. 5 is a flow diagram of between the guided rules editor, the database storing organization metadata, and the rules engine according the disclosed implementations.

FIG. 5 is a flow diagram of between the guided rules editor, the database storing organization metadata, and the rules translator/compiler according the disclosed implementations. Referring to both FIGS. 1 and 5, once the user opens the guided rules editor 122 and selects a rule via 502, the guided rules editor sends a call to the metadata service 124 to fetch the organization metadata 126 and associated data via 504. The metadata service returns the metadata and data filtered by domain via 506. The guided rules editor populates the UI selection elements using the returned organization metadata via 508. Once the user clicks "Save" 416 or otherwise periodically, the guided rules editor sends a call to the metadata service to save the rule to the database 120 via 510. The metadata service returns status of the save operation (e.g., success/fail) via 512.

Based on the user clicking "Validate" 413 or otherwise periodically, the guided rules editor sends a call to the metadata service to validate the rule via 514. The metadata service validates the rule data and the metadata against the organization metadata in the database 120 via 516. The validation operation validates both that the metadata contained within the rule definition is valid, and that the Rule itself is valid as well (variables are defined correctly; the structure of the rule makes sense, and the like). The reason for the metadata validation in 516 is that, even though the UI only shows valid metadata options, users can potentially modify the contents of their rule using browser tools directly (e.g., using chrome dev tools). Thus, the validation in 516 is performed to prevent a malicious user from attempting to run something unexpected.

The metadata service also sends a call to the rules translator 130, triggering the rules translator to translate the organization specific rules to a general-purpose rule of the rules language specification 156 required by the rules engine 115 via 518. The rules translator 130 returns a validation result via 520, which is forwarded by the metadata service 124 to the guided rules editor 122 via 522.

Once the user clicks "Compile" 418, the guided rules editor sends a call to the metadata service to compile a selected set of rules via 524. The metadata service validates the rule data and the metadata against the organization metadata in the database via 526. The metadata service also sends a call to the compiler 134, triggering the rules compiler to translate the organization specific rules to a general-purpose rule of the rules language specification 156, validate, and compile the general-purpose rule into the kbase 528 via 518. There are two reasons for a second validation. The first is that the organization metadata 126 may have changed between when the user initially validates the rule and decides to compile the rule (there could be any amount of time between the two operations). The second is that this compilation step may occur across a batch of rules that are all deployed at once, and the validation is performed across all rules (which may be combined into a single, potentially large DRL file and that resulting file is validated). This is also the reason translation is performed a second time—to perform translation across the batch of rules instead of a single rule.

After translation, the compiler 134 sends a call to the metadata service to save the kbase 528 to the database 120 via 529. In another implementation, the compiler 134 may save the kbase 528 to the database 120 directly. The compiler 134 returns a compilation result (success/fail) via 530, which is forwarded by the metadata service 124 to the guided rules editor 122 via 532.

AST-Based Rule Conversion

As previously noted, a rule may be written in accordance with a first rule syntax. For example, a rule may be written using a guided rules editor such as that depicted with respect to FIG. 4B. Additionally or alternatively, a rule may be written using a simplified set of constructs such as those described elsewhere herein. As a result, the rule may be output as a JSON file, such as that described with respect to element 152. Therefore, it may be desirable for a rules translator such as rules translator 130 to generate a rules language specification 156 rule that is then input to a rule compiler such as rule compiler 134. Such a rule may be, for example, a DRL rule or a rule that is formatted in accordance with a different rules language specification. Specifically, the rules translator 130 may generate an AST such as AST 132. This section describes an example of how such an AST may be generated and or converted into a rules language specification rule (e.g., a DRL rule).

Figure 6:
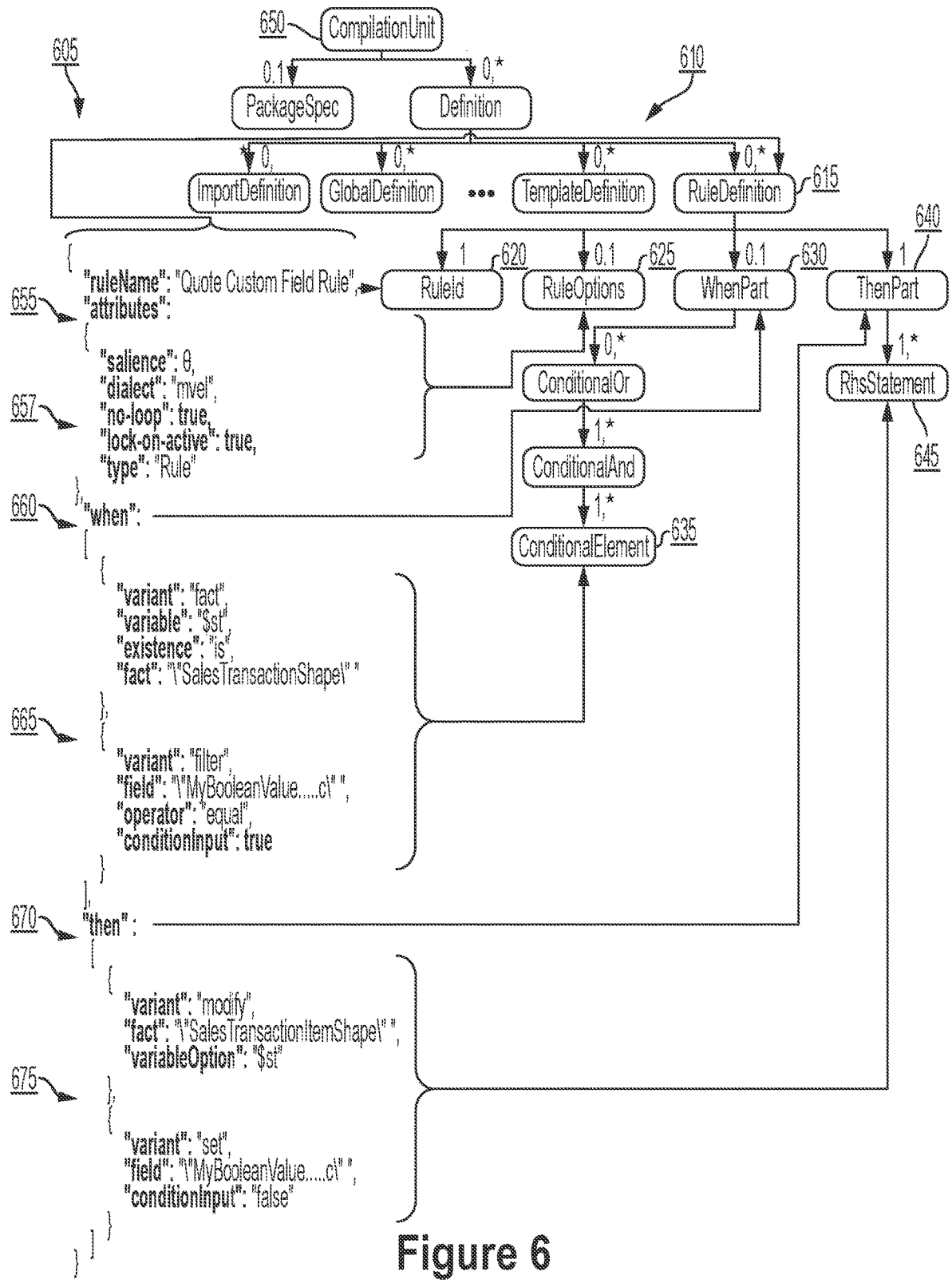
FIG. 6 depicts an example of a JSON rule and a related AST, in accordance with various implementations.

FIG. 6 depicts an example of a JSON rule 605 and a related AST 610, in accordance with various implementations. It will be understood that the rule 605 and the AST 610 are intended as highly simplified examples of such a rule/AST, and are depicted herein for the sake of discussion of concepts herein. Generally, the rule 605 may be written using the guided rules editor depicted in FIG. 4B, the simplified set of constructs described herein, and/or some other syntax or language. The controller 116 and/or metadata service 124 may then define a JSON document, or some other document structure, as described herein. Such JSON document may then be input to the rules translator 130 as described with respect to element 152.

As previously described, the rules translator 130 may then generate an AST such as AST 610 based on the JSON rule 605. In some implementations, each rule that is to be included in a rule set in the rules language (e.g., DRL) may be represented as a separate JSON document. During translation of a rule, e.g., by the rules translator 130, a JSON rule such as rule 605 may be parsed to construct an intermediate JSON tree structure in memory (e.g., a memory of an electronic device of the service provider 102 such as a volatile or non-volatile memory).

The rules translator 130 may then traverse the intermediate JSON tree structure(s) and incrementally construct the AST such as AST 610. More specifically, nodes in the intermediate JSON tree structure may represent various elements of the rule being translated. As the rules translator 130 processes respective ones of the nodes, it may make a call to a specific helper function. The call may include one or more characteristics, elements, parameters, or properties of, or attached to, the node that the rules translator 130 is processing. The helper function may construct an AST tree fragment (which may also be referred to as a "subtree") that represents or relates to that particular node. The rules translator 130 may then continue traversing the intermediate JSON tree, and thereby incrementally construct the AST 610.

Generally, the AST 610 may be similar to, and include one or more elements of, AST 132 as described herein and/or some other AST. As may be seen, respective nodes of the AST 610 may correspond to a construct that occurs in rule 605. Additionally, as may be seen in FIG. 6, the AST 610 may start from a common root node 650, which represents a starting point for implementation of a rule using the AST 610. In this example, the common rode node 650 indicates that the rule is of a "compilation unit" type. Subsequently, the AST 610 may branch from the root node 650 as shown in accordance with the rule 605. For example, the RuleDefinition node 615 of the AST 610 may correspond to the rule 605. The RuleDefinition node 615 may include a rule identifier 620, which may correspond to the "rulename" portion of the rule 605 at 655.

A number of options or parameters of the rule may be indicated in the rule 605 at 657. Such parameters may be indicated at the RuleOptions node 625. Subsequently, the rule 605 may include a conditional "when" element at 660, which may include a variety of parameters. Such parameters may be indicated in the AST 610 at the WhenPart node 630. As may be seen, the WhenPart node 630 may include a plurality of subsequent nodes such as a ConditionalOr, ConditionalAnd, and ConditionalElement node at 635. The ConditionalElement node 635 may include data related to a plurality of parameters 665 in the "when" clause 660 of the rule 605.

As a corollary to the conditional "when" at 660, a "then" element may be present in the rule 605 at 670. The AST 610 ma include a corresponding ThenPart element 640. The "then" element 670 may include a plurality of different values or parameters at 675, which may be represented in the AST 610 at RhsStatement 645.

It will be noted that each node may have an indication off cardinality associated with it. For example, the RuleDefinition node 615 has an indication of "0,*." The ThenPart node 640 may have an indication of "1." The RuleOptions node 625 may have an indication of "0,1." The ConditionalElement node 635 may have an indication of "1,*." These different indications may represent cardinality. Specifically, "1, 0" may represent that the options are "0" or "1." "1,*" may represent that the options for this field are "1" or "many." Similarly, "0, *" may represent that the options for this field are "0" or "many." As an example, RuleId (1) means that there has to be exactly one RuleId element in the AST 610. ConditionalElement (1,*) means that there has to be at least 1 conditional element, but there could be many more.

By traversing the AST 610, the rules translator 130 may be configured to generate a rule in a rule syntax different than that which was used to generate the AST 610. Specifically, once the rules translator 130 has generated the AST 610 (e.g., as described above), the rules translator 130 may traverse the AST 610 to generate a rules language specification rule (e.g., a DRL rule).

Respective nodes in the AST 610 may be associated with respective templates. As used herein, a "template" may refer to DRL generation templates. Specifically, the template may be a snippet of DRL text with "holes" or placeholders, where data from the corresponding AST node will appear. To generate the final rules language specification rule (e.g., the DRL rule), the AST is traversed with each node being visited, as described elsewhere herein. As each node in the AST is visited, the corresponding DRL generation template is loaded and populated with data from the current AST node. As the AST node is exited, the template, now populated with data from the current AST node, is rendered to a String and appended to the final DRL String being constructed. When the entire AST has been traversed, the DRL String is complete.

More generally, during generation of the rules language specification rule, the rules translator 130 may start at the root node 650. The rules translator 130 may then perform a depth-first traversal of the AST 615. As used herein, "depth-first traversal" may refer to a traversal method wherein the rules translator 130 starts at the root node 650 and traverses a given branch of the AST 610 until it reaches an end node (e.g., ConditionalElement node 635). The rules translator 130 may then start at the root node 650 and traverse a different branch or sub-branch of the AST 610 until it reaches an end node. The traversal process may iterate until all branches and sub-branches of the AST 610 have been traversed.

More specifically, the rules translator 130 may traverse respective nodes of a branch of AST 610. At each node, the template associated with that node type may be loaded into memory and populated with the data elements contained within or associated with the node. The template may then be rendered to a string that represents a fragment of the final rules language specification rule.

The rules translator 130 then moves to the next node on the branch and repeats the process of loading the template and rendering a further fragment of the final rules language specification file. The process may be repeated at respective branches of the AST 610 until all nodes have been addressed and the final rules language specification rule has been generated.

It will be understood that the rule 605 and AST 610 depicted in FIG. 6 is intended as a very simplified example for the sake of discussion herein. Real world implementations of a rule 605 or an AST 610 may be significantly more complicated than the AST 610 depicted in FIG. 6. Additionally, it will be understood that the specific AST 610 derived from rules such as rule 605 may be different in different implementations, dependent on how the rules translator 130 traverses the input file and/or the syntax of the input file.

Figure 7:
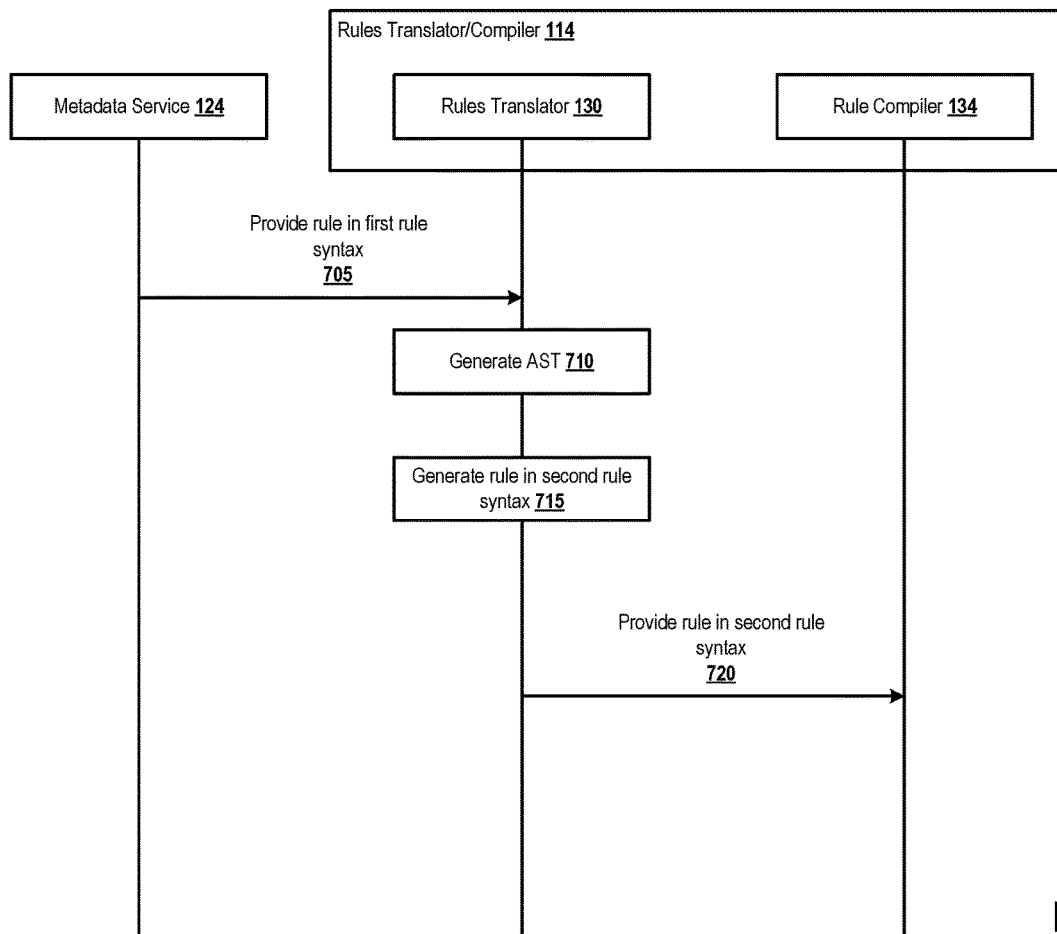
FIG. 7 depicts an example of a process flow related to AST-based rule conversion, in accordance with various implementations.

FIG. 7 depicts an example of a process flow related to AST-based rule conversion, in accordance with various implementations. As may be seen the process flow may generally relate to communication between the metadata service 124, the rules translator 130, and the rule compiler 134.

The metadata service 124 may provide a rule (e.g., rule 605) in a first rule syntax at 705. The first rule syntax may be, for example, JSON or some other rule syntax. In some implementations, the first rule syntax may be a simplified rule syntax (e.g., as may be defined in accordance with the simplified rule syntax described herein) or some other rule syntax.

The rules translator 130 may then generate an AST at 710. The AST may be similar to, for example, AST 610. Specifically, the rules translator 130 may traverse the rule provided at 705 to generate an AST such as AST 610 based on constructs present in the provided rule, as described above.

Subsequently, the rules translator 130 may traverse the AST at 715 to generate a rule in a second rule syntax based on the AST. For example, the rules translator 130 may traverse the AST that was generated at 710 to generate a rule in a DRL syntax or some other syntax. The rules translator 130 may then provide the rule, in the second rule syntax (e.g., DRL), to the rule compiler 134 at 720. The rule compiler 134 may then compile, store, and/or execute the DRL rule as described elsewhere herein.

It will be understood that the examples of the specific syntaxes herein (e.g., JSON and DRL) are intended as example syntaxes, and other implementations may use or be based on some other syntax. For example, the rule may be provided to the rules translator 130 in a syntax that is different than JSON, and/or the rules translator 130 may output the rule in a syntax that is different than DRL.

Figure 8:
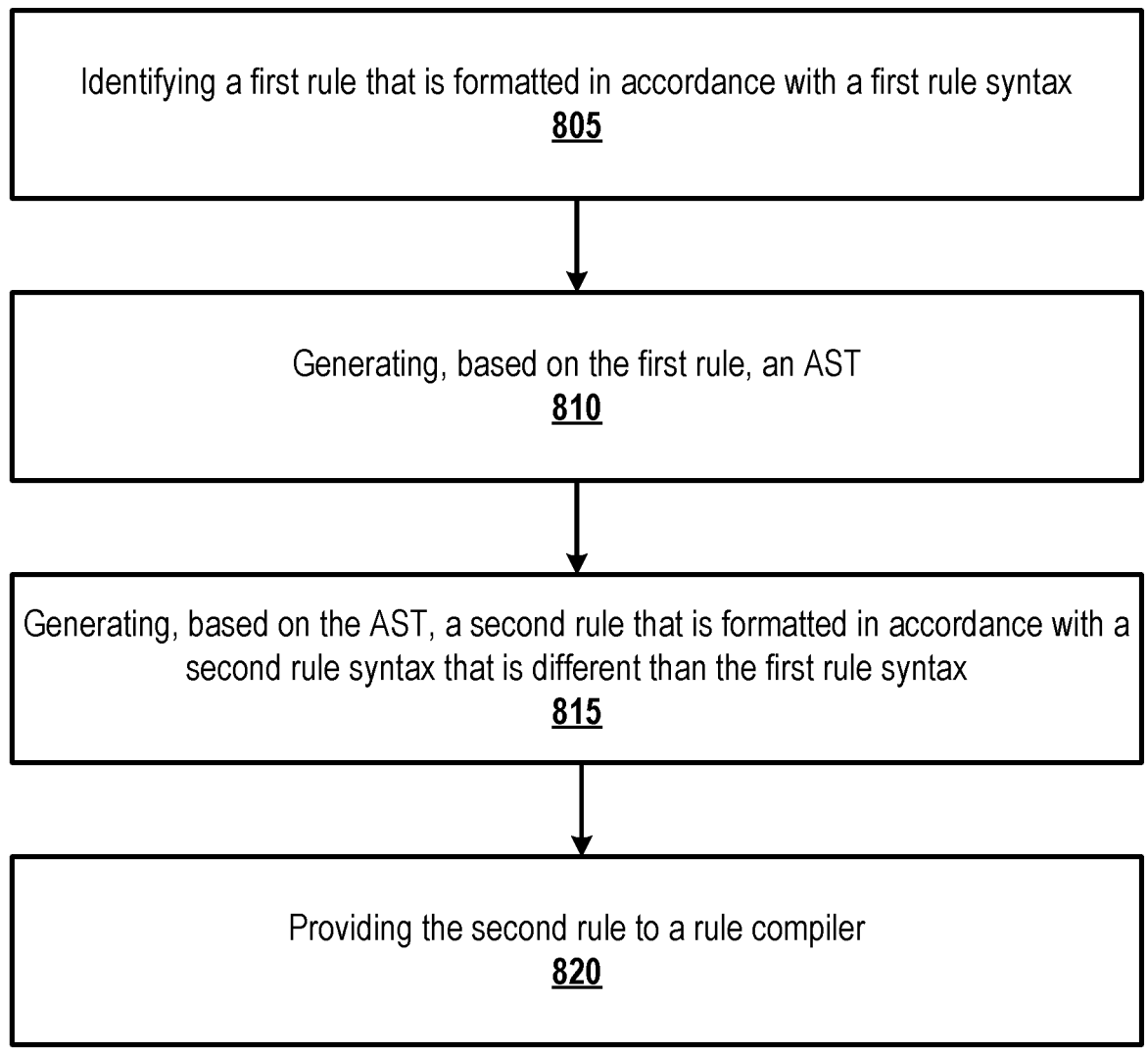
FIG. 8 depicts an example of a technique related to AST-based rule conversion, in accordance with various implementations.

FIG. 8 depicts an example of a technique related to AST-based rule conversion, in accordance with various implementations. In embodiments, the technique of FIG. 8 may be implemented by a rules management system 100 and, more specifically, by a rules translator such as rules translator 130.

The technique may include identifying, at 805, a first rule that is formatted in accordance with a first rule syntax. The first rule may be similar to, for example, the rule described at 605, and the first rule syntax may be, for example, JSON or some other rule syntax. Specifically, the first rule may relate to a process that is to be performed by a rules engine.

The technique may further include generating, based on the first rule, an AST. The AST may be similar to, for example, AST 610. The AST 610 may be generated by the rules translator 130 based on one or more constructs of the provided rule as described above with respect to FIG. 6.

The technique may further include generating, at 815 based on the AST, a second rule that is formatted in accordance with a second rule syntax that is different than the first rule syntax. The second rule syntax may be, for example, DRL or some other rule syntax. Generally, the second rule may be similar to the rule described with respect to elements 715 and 720.

The technique may further include providing, at 820, the second rule to a rule compiler (e.g., rule compiler 134 of the rules engine 114. The rule compiler 134 may then execute the process related to the first rule, and execution of the process may be based at least in part on the second rule. In some implementations, the rule compiler may additionally or alternatively store the second rule in a database (e.g., DB 120). In other implementations, the rule compiler may additionally or alternatively perform some other action based on or related to the second rule as described elsewhere in this specification.

It will be noted that the process flow of FIG. 7 and the technique of FIG. 8 are intended as one example of such a process flow and/or technique, and other implementations may include more or fewer elements, elements arranged in a different order than depicted, etc.

Examples of techniques related to the AST-based Rules Conversion may includes one or more of the following:

Example 1 may relate to a method to be performed by a rules translator, wherein the method comprises: identifying a first rule that is formatted in accordance with a first rule syntax; generating, based on the first rule, an abstract syntax tree (AST); generating, based on the AST, a second rule that is formatted in accordance with a second rule syntax that is different than the first rule syntax; and providing the second rule to a rule compiler.

Example 2 may relate to the method of example 1, and/or some other example herein, wherein the first rule syntax is JavaScript Object Notation (JSON).

Example 3 may relate to the method of any of examples 1-2, and/or some other example herein, wherein the second rule syntax is a rule language specification.

Example 4 may relate to the method of example 3, and/or some other example herein, wherein the rule language specification is Drools Rule Language (DRL).

Example 5 may relate to the method of any of examples 1-4, and/or some other example herein, wherein respective nodes of the AST correspond to a construct that occurs in the first rule.

Example 6 may relate to the method of any of examples 1-5, and/or some other example herein, wherein the first rule relates to a process that is to be executed by a rules engine, and wherein the rules compiler is to perform the process based at least in part on the second rule.

Example 7 may relate to the method of example 6, and/or some other example herein, wherein the process relates to an organization that provides the first rule.

Example 8 may relate to the method of example 6, and/or some other example herein, wherein the first rule syntax relates to a business domain of the process.

Example 9 may relate to the method of any of examples 1-8, and/or some other example herein, wherein the rule compiler is to store the second rule in a database that is communicatively coupled with the rule compiler.

Example 10 may relate to an apparatus or system configured to perform some or all of any of examples 1-9, and/or some other example herein.

Example 11 may relate to an apparatus or system comprising means to perform some or all of any of examples 1-9, and/or some other example herein.

Example 12 may relate to one or more non-transitory computer-readable media comprising instructions that, upon execution of the instructions by one or more processors of an electronic device or system, are to cause the electronic device or system to perform some or all of any of examples 1-9, and/or some other example herein.

Selective Rule Loading

It will be understood that, in many implementations, a rule may be written as a rule of a set of rules. For example, a set of rules may relate to a given business-related domain or context. As one example, a set of pricing rules may be written that may relate to application of a discount or a promotion for a given product or customer. As another example, a rule author may wish to apply a rule to all products that they sell. In some cases, a rule related to taxes applied to a given product may be different than rules related to a holiday-specific promotion. It will be understood that these examples are intended as examples for the sake of discussion, and other business-related domains or context may exist as described elsewhere herein, and such domains or context may include or relate to various groupings of rules. Such domains may include, for example, tax, pricing, validation, sales, marketing, etc. It will be understood that these are only examples, and various additional/alternative domains may exist for use with a given rule structure.

Embodiments herein relate to the use of tags or metadata for a given rule to group various rules into subsets of domain-specific rules. Specifically, as a rule author writes one or more rules, the author may be able to group the rules into subsets according to a variety of factors. Factors for such subsets may be factors such as a product, a given service, a business-related context (e.g., sales, marketing, taxation, etc.), a holiday or holiday season, a specific promotion, a customer or type of customer (e.g., whether the customer is a large business, a small business, a single individual, a government-related entity, etc.), a location of the customer, a seller or type of seller (e.g., whether the seller is a large business, a small business, a single individual, a government-related entity, etc.), a location of the seller, or some other factor. In this way, an author may be able to define subsets of rules that are specific to one or more contexts or domains through the use of one or more tags in a manner that the rules do not affect a different context or domain that is subject to a different tag.

Subsequently, when the rules are loaded by a rules engine such as rules engine 115 for execution in one or more processes at run-time, then only rules relevant to a specific grouping may be loaded. For example, if a process is related to sales, then a rule subset related to validation may not be loaded at run-time. Similarly, if a rule is related to a specific customer or product, then a subset of rules that are related to another customer or product may not be loaded at run-time. Therefore, embodiments herein may provide one or more advantages such as reduction of use of processor resources or quicker process implementation because significantly fewer rules need to be loaded by a rules engine such as rules engine 115.

Figure 9:
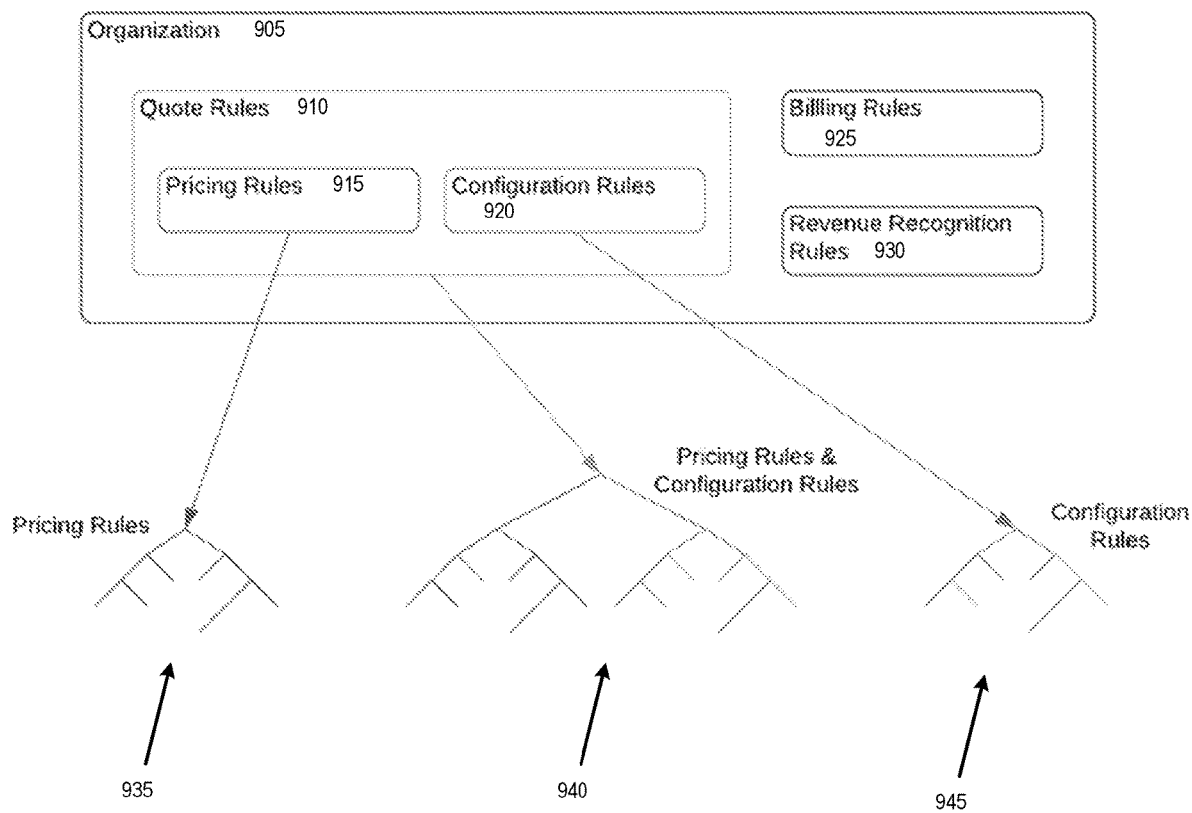
FIG. 9 depicts an example of how subsets of rules may be organized, in accordance with various embodiments.

FIG. 9 depicts an example of how subsets of rules may be organized, in accordance with various embodiments. Specifically, in FIG. 9, an organization 905 may have written a plurality of rules for a variety of different business-related contexts or domains. The organization 905 may be, for example, a business, a government entity, a not-for-profit, a school, an individual user, a an apartment complex, a floor of a building, a department of an organization, or some other type of entity or rule author.

One such domain may be, for example, quote rules at 910. Quote rules may be rules that relate to provision of a quote to a potential customer of the organization 905. For example, the organization 905 may be a provider of a good, and the rules 910 may relate to a quote that could be given to a potential customer for that good. As may be seen, the organization may have one or more additional or alternative rule sets may be or include billing rules 925 (e.g., rules that may relate to how bills are generated, delivered, and/or processed) and revenue recognition rules 930 (e.g., bills related to how revenue is tracked or monitored).

Various ones of the rules may have one or more subcategories of rules. For example, the quote rules 910 may include pricing rules 915 (e.g., rules related to how a price may be identified or categorized) and configuration rules 920 (e.g., rules related to how the quote may be structured or what elements the quote may be required to have).

In some implementations, the various rules 915/920/925/930 may be organized according to a folder structure. Element 935 depicts a very simplified representation of the pricing rules 915 represented as a Rete nework. Element 945 depicts a very simplified representation of the configuration rules 945 represented as a Rete network. Element 940 depicts an example of the pricing rules 915 and the configuration rules 920 represented as a Rete network. It will be understood that, in element Y140, one branch of the Rete network 940 from the initial node may lead to the pricing rules Rete network 935 while another branch of the AST 940 from the initial node may lead to the configuration rules Rete network 945.

As may be recognized, and as described above, not all rules may be necessary for a given process. For example, if the process is for an organization that is different than organization 905, then it may not be necessary to load any of the quote rules 910, the pricing rules 915, the configuration rules 920, the billing rules 925, or the revenue recognition rules 930. Similarly, if the process only relates to billing, then only the billing rules 925 may be loaded, and (for example) the quote rules 910 may not be loaded. Similarly, if the process only relates to pricing of a quote, then only pricing rules 915 may be loaded, and configuration rules 920 may not be loaded. As such, in some cases only a subset of the plurality of possible rules may be loaded for a given process.

It will be recognized that the depiction of FIG. 9, and the above-provided description, is a very highly simplified example for the sake of discussion. In some real-world implementations, rules may apply to all organizations, such that one or more rules may be loaded regardless of the domain or context. In some real-world implementations, different rulesets may share one or more rules such that a rule of pricing rules 915 may also be present in the billing rules 925. In other words, the above-described example is intended as illustrative rather than definitive.

Figure 10:
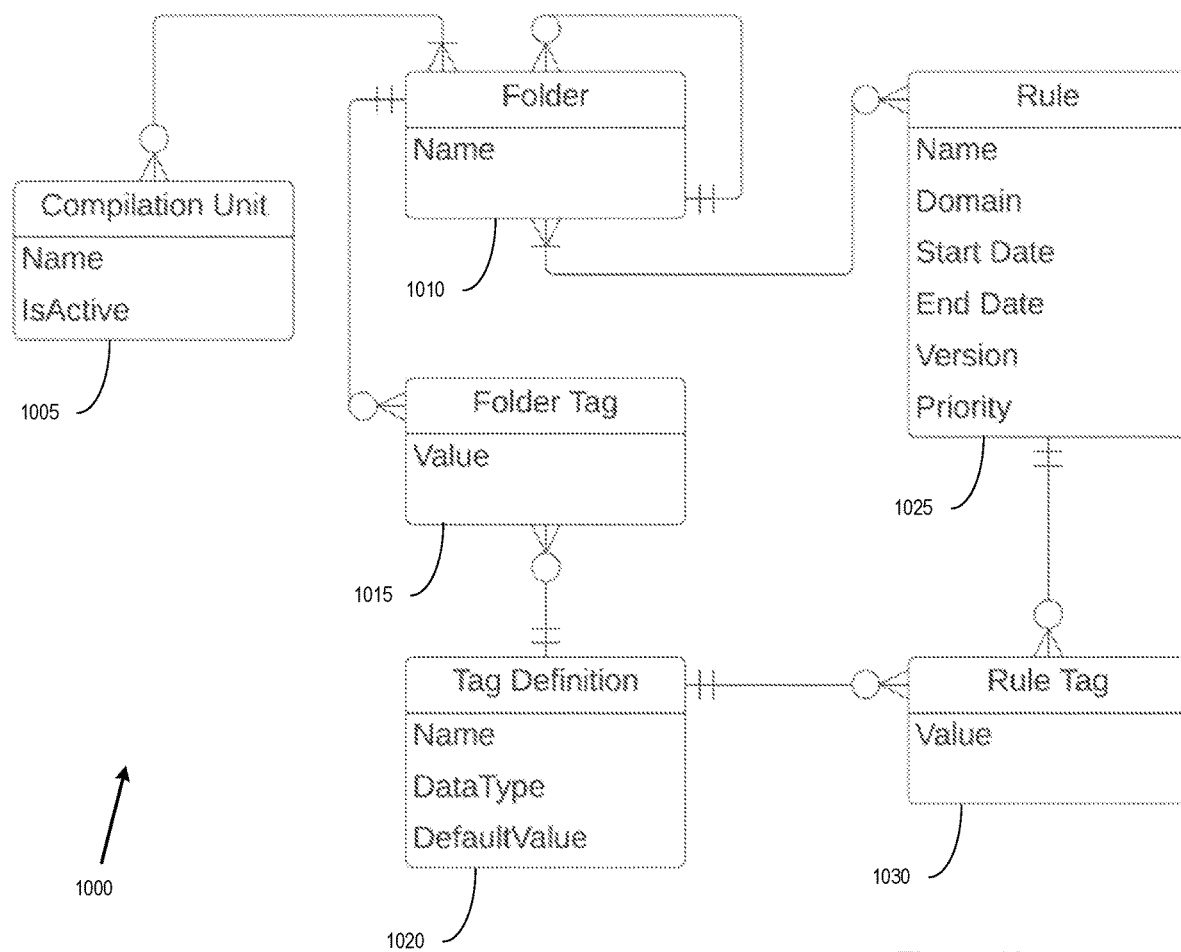
FIG. 10 depicts an example of a rule structure, in accordance with various embodiments.

FIG. 10 depicts an example of a rule structure 1000, in accordance with various embodiments. Specifically, the example of FIG. 10 is intended as a symbolic depiction of how rules may be logically organized and grouped, as well as example elements that may be present in the grouping logic. In various implementations, different names, characteristics, or elements may be used than depicted in FIG. 10. It will be recognized that FIG. 10 is depicted using a notation that may be referred to as "crow's foot" notation. A primer on such notation may be found, for example at: https:// en.wikipedia.org/wiki/Entity-relationship_model#Crow's_foot_notation (last accessed Oct. 17, 2022).

It will be understood that the rule structure 1000 may present a variety of advantages. For example, the rule structure 1000 may avoid rule duplication where multiple rule taxonomies apply. Specifically, as described below, folder and/or rule tags may be used. Without these tags, if a given rule definition resides in two different folders, then the rule may be required to be duplicated. Such duplication can cause maintenance issues. However, the tagging feature described herein may allow users to define a folder structure for the most common and/or reasonable single taxonomy, and then apply tags to both rules (via rule tags) and folders (via folder tags). As such, a user may be able to define a compilation unit that is composed of folders and/or tags such that the resulting Rete network is composed of rules defined within multiple folders. In essence, the folder/tag structure may allow the user the ability to create an unlimited number of rule combinations from a single folder taxonomy.

Generally, the rule structure 1000 may be understood to include or relate to a number of rule characteristics. Different ones of the rule characteristic may be associated with different aspects or elements of the rules as shown in FIG. 1000. Different ones of the elements of FIG. 1000 such as the elements related to a name, a value, etc., or higher level elements such as "folder," "rule tag," "rule," etc. may be considered to be a rule characteristic as used herein. As used herein for the sake of description of FIG. 10, the term "rule characteristic" may be considered to be interchangeable with the term "element" or "characteristic."

The rule structure 1000 may include a number of folders 1010. Respective folders 1010 may have a characteristic such as a "name." The name of the folder 1010 may indicate a name of the rule subset to which the folder belongs. Example names may be, for example "Shoe Rules," "Fourth of July Marketing," "Organization," "Quote Rules," etc. It will be understood that, in some implementations, the name of a given folder 1010 may not be a human readable name but rather may be a hashtag, a numeric value, or some other type of designator. As may be seen, Folders 1010 may be nested within one another. Specifically, a folder 1010 may have zero or more sub-folders, while a sub-folder may only have a single parent folder.

A folder 1010 may be associated with a compilation unit 1005. Specifically, a compilation unit 1005 may contain or relate to one or more folders 1010, and a folder 1010 may be associated with zero compilation units 1005, one compilation unit 1005, or a plurality of compilation units 1005.

Compilation units 1005 may relate to a number of rules. More generally, a compilation unit 1005 may be thought of as a subset of a plurality of possible rules. Similar to a folder 1010, a compilation unit 1005 may be a rule characteristic that may have a variety of additional rule characteristics such as a name. The name of a compilation unit 1005 may be similar to a name of a folder 1010. For example, a compilation unit 1010 may have a name such as "shoe rules," "independence day rules," "quote rules," "pricing units," "tax rules," etc. Similarly to folders 1010, in some implementations the name of a compilation unit 1005 may not be human readable, but rather may be a numeric value, a hash, or some other type of designator.

Additionally, in some embodiments, a compilation rule 1005 may include a designator such as "IsActive." "IsActive" may indicate whether a compilation unit 1005 (and its associated rules) is intended to be executed by a rules engine 115 at runtime. Specifically, "IsActive" may be a binary designator such that it is "true"/"false," "1"/"0,", etc.

Different folders 1010 may be associated with a folder tag 1015, which may in turn be associated with a tag definition 1020. As may be seen, a folder tag 1015 may only be associated with a single tag definition 1020, while a tag definition 1020 may be associated with zero folder tags 1015, one folder tag 1015, or a plurality of folder tags 1015. Similarly, a folder tag 1015 may be associated with a single folder 1010, and a folder 1010 may be associated with zero folder tags 1015, one folder tag 1015, or a plurality of folder tags 1015. As may be seen, a folder tag 1015 may have or be associated with a value. The value for a folder tag 1015 may indicate the value that the tag represents. For example, if the folder tag 1015 (or, rule tag 1030 as described in greater detail below) relates to a region, then the value for the folder tag or rule tag could be "United States," "North America," etc. If the folder or rule tag is "Support Level," then the value could be a number between 1-5 to indicate the priority of support for the related account. It will be understood that these values or relationships are intended as examples of an implementation for the purpose of discussion, and other implementations may include additional/ alternative values or relationships.

A tag definition 1020 may include some form of name or identifier which can be alphanumeric, a hash, etc. An example name could be, for example, "region," which may indicate a region to which the tag definition 1020 is associated, "approval required," which may indicate how a tag may be processed, or some other type of identifier. Respective tag definitions 1020 may also include or be associated with a datatype element which may indicate how the value of the tag definition is input, for example as a string, a boolean input, a numeric input, etc. A tag definition 1020 may further include a default value field, which may include data in the form associated with the datatype field. For example, if the default value field may be a string of characters, a number, a true/false designation, etc. Generally, the tag definitions 1020 may be or relate to a custom tag that can be applied to rules and/or folders to apply additional characteristics or attributes to individual rules or folders of rules.

Different ones of the folders 1010 may be associated with different rules 1025. Specifically, a folder 1010 may be associated with zero rules 1025, one rule 1025, or a plurality of rules 1025. A rule 1025 may be associated with one folder 1010 or a plurality of folders 1010.

Respective rules 1025 may have a plurality of fields such as a name, a domain, a start date, an end date, a version, and a priority level. The name may be a human-readable name of the rule for the sake of identification, while in other implementations the name may be numeric, a hash, etc. The domain may indicate the domain to which the rule belongs (e.g., promotion, pricing, marketing, sales, validation, tax, or some other domain). The start date and end date may indicate when a rule is considered active or inactive. Version may indicate the version of the rules, such that tracking updates to the rule is possible. Priority may indicate a priority level of the rule such that execution of some rules may be prioritized over other rules.

Different rules 1025 and/or tag definitions 1020 may be associated with a rule tag 1030. A rule tag 1030 may be considered to be a tag definition applied to a given rule 1030. As may be seen in FIG. 10, a rule tag 1030 may be associated with one rule 1025, while a rule 1025 may be associated with zero rule tags 1030, one rule tag 1030, or a plurality of rule tags 1030. Similarly, a rule tag 1030 may be associated with a single tag definition 1020, whereas a tag definition 1020 may be associated with zero rule tags 1030, one rule tag 1030, or a plurality of rule tags 1030. A rule tag 1030 may include a value field that operates in a manner similar to that of the folder tag 1015, described above.

It will be recognized that there may be different ways to implement rule structure 1000. Specifically, in some implementations, the rule structure 1000 may be implemented in accordance with one or more AST(s) in the form of a Rete network. Specifically, the folder structure depicted in 1000 provides one example technique for organizing rules in order to generate one or more compilation units, or Rete networks. Generally, the structures depicted at 935, 940, and 945 are separate, independently deployable Rete networks.

In other implementations, the rule structure 1000 may be implemented using file names, folder names, and metadata. For example, different elements such as compilation unit 1005, elements of a rule 1025 such as the domain, start date, end date, etc., or other elements of the rule structure 1000 may be implemented as metadata that is appended to an element such as a folder name or rule name.

The tables below depict examples of how different ones of the elements of FIG. 10 may be used together to identify subsets of rules from a plurality of rules. Specifically, Table 1, below, depicts a number of different folders, where respective folders may correspond to different subsets of folders. As may be seen in Table 1, the folders "ShoeCo 1 Rules" and "ShoeCo 2 Rules" may be subsets of the "Shoe Rules" folder. The Folders depicted in Table 1 may generally correspond to the element folder 1010 element of FIG. 10.

TABLE 1

| FolderID | FolderName | ParentFolderID |
| --- | --- | --- |
| F1 | Shoe Rules | Null |
| F2 | ShoeCo 1 Rules | F1 |
| F3 | ShoeCo 2 Rules | F1 |
| F4 | Fourth of July Marketing | Null |

Table 2 depicts an example of different rules, which may generally be seen as examples of the rules 1025 element of FIG. 10.

TABLE 2

| RuleID | RuleName | Domain | StartDate | EndDate | Version | Priority |
| --- | --- | --- | --- | --- | --- | --- |
| R1 | Buy 2 Get 1 Free | Promotion | Jun. 15, 2022 | Aug. 15, 2022 | 1 | 1 |
| R2 | 5% Discount Over $250 | Pricing | Jun. 15, 2022 | Aug. 15, 2022 | 1.2 | 1 |

Table 3 depicts an example of how rule(s) (e.g., rules 1025 as depicted in Table 2) may be associated with folder(s) (e.g., folders 1010 as depicted in Table 1). It will be noted that Table 3 may be implemented as, or stored in, metadata of one or more of the rule(s) or folder(s). It will also be noted that, as depicted in Table 3, both of the rules R1 and R2 depicted in Table 2 may be associated with the ShoeCo 1 Rules and the ShoeCo 2 Rules. It will further be noted that the Fourth of July Marketing folder, folder F4 of Table 1, is only associated with rule R2 of Table 2.

TABLE 3

| RuleFolderRelationshipID | FolderID | RuleID |
| --- | --- | --- |
| RF1 | F2 | R1 |
| RF2 | F3 | R1 |
| RF3 | F2 | R2 |
| RF4 | F3 | R2 |
| RF5 | F4 | R2 |

Table 4 depicts an example of compilation units, which may be similar to compilation unit 1005 of FIG. 10.

TABLE 4

| CompilationUnitId | Name | IsActive |
| --- | --- | --- |
| CU1 | Shoe Rules | True |
| CU2 | Independence Day Rules | False |

Table 5 depicts an example correlation between the compilation units of Table 4 and the folders of Table 1. It will be noted that the compilation unit CU1, named "Shoe Rules" is associated with the folder F1 of Table 1 named "Shoe Rules." Similarly, the compilation unit CU2, named "Independence Day Rules" is associated with the folder F4 of Table 1 named "Fourth of July Marketing."

TABLE 5

| CompilationUnitFolderRelationID | CompilationUnitID | FolderID |
| --- | --- | --- |
| CUFR1 | CU1 | F1 |
| CUFR2 | CU2 | F4 |

Table 6 depicts an example of tag definitions such as tag definitions 1020. As may be seen, the tag definitions may be of different types, (e.g., string, boolean, etc.), and the resultant values may take a different form (e.g., a string and a true/false identifier).

TABLE 6

| TagDefinitionID | TagDefinitionName | DataType | DefaultValue |
| --- | --- | --- | --- |
| TD1 | Region | String | California |
| TD2 | Approval Required | Boolean | False |

Table 7 depicts an example of how a folder tag (e.g., a folder tag 1015), a folder (e.g., a folder 1010 as defined in Table 1), and a tag definition (e.g., a tag definition 1020 as defined in Table 6) may be associated with one another. As may be seen in Table 7, both the folder F1 (e.g., "Shoe Rules") and the folder F4 (e.g., "Fourth of July Marketing") may be associated with tag definition TD2, which may indicate that approval of a rule is not required. In other words, a process that implements the rule may run without explicit approval by a system administrator.

TABLE 7

| FolderTagID | FolderID | TagDefinitionID | Value |
|---|---|---|---|
| FT1 | F1 | TD2 | true |
| FT1 | F4 | TD2 | false |

Table 8 depicts an example of how a rule (e.g., one of rules 1025 as defined in table 2) may be associated with a rule tag (e.g., rule tag 1030) and a tag definition (e.g., tag definition 1020 as defined in table 6). As may be seen, both rules R1 and R2 may be associated with tag definition TD1, related to a region. As such, the tag definition may define a region in which the rule may be active.

TABLE 8

| RuleTagID | RuleID | TagDefinitionID | Value |
|---|---|---|---|
| RT1 | R1 | TD1 | Oregon |
| RT2 | R2 | TD1 | Washington |

It will be understood that the above-depicted Example shown with respect to Tables 1-8 is intended as one example of how rules and folders may be associated using metadata. Other implementations may have more or fewer elements, elements with different names and/or values (or types of values), etc.

Figure 11:
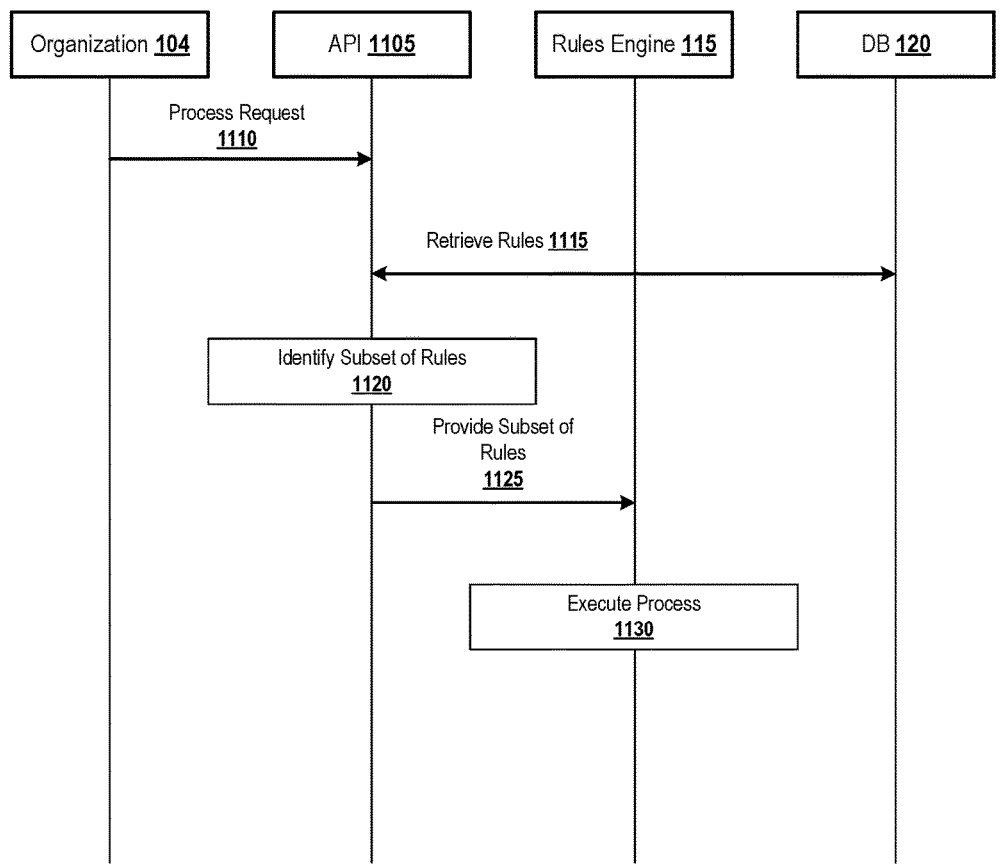
FIG. 11 depicts an example of execution of a process based on a subset of rules, in accordance with various embodiments.

FIG. 11 depicts an example of execution of a process based on a subset of rules, in accordance with various embodiments. It will be understood that the example of FIG. 11 is intended as one example, and other implementations may use or relate to a different process flow. Specifically, as shown in FIG. 11, the process flow may relate to communication between an organization 104 (or a user thereof), a rules engine 115, and a database 120. The process flow may further include communication between one or more of the above-listed elements and an application programming interface (API) 1105. Generally, the API 1105 may be considered to be a client of the rules engine 115. The API 1105 may be implemented as hardware, software, firmware, and/or some combination thereof that is communicatively coupled with the rules engine 115. In some embodiments, the API 1105 may be physically separate from a device that implements the rules engine 115, while in other embodiments the API 1105 and rules engine 115 may be implemented on the same physical device (e.g., a server). In some embodiments, different domains may have different APIs 1105. That is, a different API may handle processes related to pricing than an API that handles processes related to validation, marketing, taxation, etc. In some embodiments, the APIs 1105 may be associated with different domains, or domains corresponding to different characteristics such as an API for a given client, etc.

In some embodiments, the API 1105 may not be necessary, and instead the rules engine 115 may function as or include the functionalities of the API described herein.

Generally, the API 1105 may be used in situations where the rules engine 115 is a standard "off-the-shelf" rules engine 115 without functionality-specific modification. Rather, the modification may be provided through the use of the API 1105

In the process, an organization 104 (and/or a user of the organization) may transmit a request related to execution of a process at 1110. The request may be received at the API 1105 or, in some implementations, the request may additionally/alternatively be received at the rules engine 115. In some implementations, the request may be transmitted to the rules engine 115, which may then forward the request to the appropriate API 1105 (e.g., by analyzing the request, identifying the relevant domain, and then forwarding the request to an API 1105 associated with that domain). In other implementations, the request may be transmitted directly to the API 1105 in addition to or instead of the rules engine 115.

The API 1105 may retrieve rules from the database 120 at 1115. Specifically, the API 1105 may retrieve all rules from the database 120 that have been previously generated and/or stored in the database. The API 1105 may then, at 1120, identify a subset of the retrieved rules. Such a subset may be identified based on the request received at 1110, and may be identified based on a number of criteria, which are referred to herein as characteristics of the process request. Generally, identification of the subset of rules may be based on correlation of one or more characteristics of the process request with one or more rule characteristics.

For example, if the request indicates a specific compilation unit, then all rules associated with that compilation unit may be identified. If the request is from an identified organization, or department of such an organization, then all rules associated with that organization or department may be identified by the API 1105. If the request relates to a process that is to be performed at a given time, or in a given location, then all rules associated with that time period or that location may be identified. In some implementations, the API 1105 may only identify rules that are marked as being "active." It will be understood that these examples are intended as only some examples, and other implementations may have one or more additional or alternative criteria by which to identify the subset of rules.

It will be understood that the above-described implementation where all rules are retrieved by the API 1105 and then subsequently culled to identify a subset of rules at 1120 is intended as one example of such an implementation. In other implementations, the API 1105 may compare one or more rule characteristics of rule stored in DB 120 with a characteristic of the process request, and only retrieve matching rules from the DB 120. In other words, elements 1120 and 1115 may be combined in other implementations. Such an implementation may be desirable where bandwidth between the API 1105 and the DB 120 is limited. Other variations may be present in other implementations.

Once the subset of rules has been identified at 1120, then the subset of rules 1125 (or indications thereof) may be provided to the rules engine at 114 at 1125. The rules engine 115 may then execute the process 1130 based on the subset of rules at 1130. Note that, in some implementations, the rules themselves may be provided to the rules engine 115 while, in other implementations, identifiers of the rules (e.g., a hash that identifies the rule or some other indicator) may be provided to the rules engine 115, and the rules engine 115 may pull the corresponding rule from the DB 120.

FIG. 12 depicts an example of a technique by which a process may be executed based on a subset of a plurality of rules. Generally, the process of FIG. 12 may be performed by one or both of an API (e.g., API 1105) and a rules engine (e.g., rules engine 115). For example, in some implementations, the rules engine 115 may include or implement the functionalities described herein with respect to the API 1105. It will be understood that the process of FIG. 12 is intended as one example process, and other implementations may include more or fewer elements, elements arranged in a different order than depicted, etc.

The process may include identifying, at 1205 by an API such as API 1105 that is communicatively coupled with a rules engine such as rules engine 115, a plurality of rules. The plurality of rules may be stored, for example in a database such as DB 120. Respective rules of the plurality of rules may be associated with at least one rule characteristic of a plurality of rule characteristics. The different rule characteristics may be the rule characteristics depicted and described with respect to, for example, FIG. 10 and may include characteristics such as a folder, a rule tag, a name, a value, a start or end date, a domain, or some other characteristic or element depicted in FIG. 10.

The process may further include identifying, at 1210 by the API, one or more characteristics of a process request received from a customer. The process request may be, for example, the process request described with respect to element 1110. The characteristics of the process request may include, for example, a characteristic of the customer (e.g., the entity type of the customer such as whether the customer is a government entity, a business, a single individual, etc.), a geographic location related to the process, a time period related to the process, a business domain of the process, or some other characteristic as described above. As described, the process request may relate to a process that is to be executed based on one or more rules of the plurality of rules identified at 1205.

The process may further include identifying, at 1215 by the API based on correlation of the one or more characteristics of the process request with the plurality of rule characteristics, a subset of the plurality of rules. The subset of rules may be similar to those described above with respect to element 1120. It will be noted that the subset of rules may include less than all of the plurality of rules identified at 1205.

The process may further include providing, by the API at 1220, one or more indications of rules in the subset of the plurality of rules to the rules engine. Such provision may be similar to that described above with respect to element 1125.

The process may further include executing, at 1225 by the rules engine, the process based on the subset of the plurality of rules. Such execution may be similar to that described above with respect to element 1130.

Example techniques related to the selective rule loading may include one or more of the following:

Example 1 may include a method comprising: identifying, by an application programming interface (API) that is communicatively coupled with a rules engine, a plurality of rules, wherein respective rules of the plurality of rules are associated with at least one rule characteristic of a plurality of rule characteristics; identifying, by the API, one or more characteristics of a process request received from a customer, wherein the process request relates to a process that is to be executed based on one or more rules of the plurality of rules; identifying, by the API based on correlation of the one or more characteristics of the process request with the plurality of rule characteristics, a subset of the plurality of rules, wherein the subset is less than the plurality of rules; providing, by the API, one or more indications of rules in the subset of the plurality of rules to the rules engine; and executing, by the rules engine, the process based on the subset of the plurality of rules.

Example 2 may include the method of example 1, and/or some other example herein, wherein the request relates to a process that is to be executed by the rules engine based on the subset of the plurality of rules.

Example 3 may include the method of any of examples 1-2, and/or some other example herein, wherein respective rule characteristics of the plurality of rule characteristics are implemented as metadata of a folder in which the rule is placed.

Example 4 may include the method of any of examples 1-3, and/or some other example herein, wherein a characteristic of the process request is related to an entity type of the customer.

Example 5 may include the method of any of examples 1-4, and/or some other example herein, wherein the characteristic of the process request is related to a geographic location associated with the process.

Example 6 may include the method of any of examples 1-5, and/or some other example herein, wherein the characteristic of the process request is related to a time period in which the process is to be executed.

Example 7 may include the method of any of examples 1-6, and/or some other example herein, wherein the characteristic of the process request is related to a business domain associated with the process.

Example 8 may relate to an apparatus or system configured to perform some or all of any of examples 1-7, and/or some other example herein.

Example 9 may relate to an apparatus or system comprising means to perform some or all of any of examples 1-7, and/or some other example herein.

Example 10 may relate to one or more non-transitory computer-readable media comprising instructions that, upon execution of the instructions by one or more processors of an electronic device or system, are to cause the electronic device or system to perform some or all of any of examples 1-7, and/or some other example herein.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 13A:
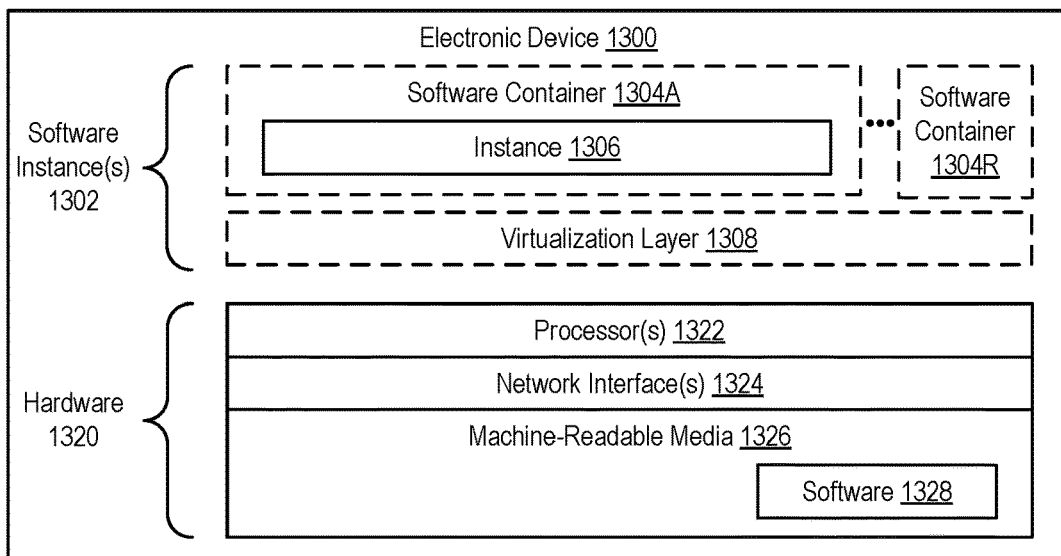
FIG. 13A is a block diagram illustrating an electronic device according to some example implementations.

FIG. 13A is a block diagram illustrating an electronic device 1300 according to some example implementations. FIG. 13A includes hardware 1320 comprising a set of one or more processor(s) 1322, a set of one or more network interfaces 1324 (wireless and/or wired), and machine-readable media 1326 having stored therein software 1328 (which includes instructions executable by the set of one or more processor(s) 1322). The machine-readable media 1326 may include non-transitory and/or transitory machine-readable media. Each of the previously described clients and the network protocol for the metadata-driven rules editor may be implemented in one or more electronic devices 1300. In one implementation: 1) each of the clients is implemented in a separate one of the electronic devices 1300 (e.g., in end user devices where the software 1328 represents the software to implement clients to interface directly and/or indirectly with the network protocol for the metadata-driven rules editor (e.g., software 1328 represents a web browser, a native client, a portal, a command-line interface, and/or an application programming interface (API) based upon protocols such as Simple Object Access Protocol (SOAP), Representational State Transfer (REST), etc.)); 2) the network protocol for the metadata-driven rules editor is implemented in a separate set of one or more of the electronic devices 1300 (e.g., a set of one or more server devices where the software 1328 represents the software to implement the network protocol for the metadata-driven rules editor); and 3) in operation, the electronic devices implementing the clients and the network protocol for the metadata-driven rules editor would be communicatively coupled (e.g., by a network) and would establish between them (or through one or more other layers and/or or other services) connections for submitting configuration data to the network protocol for the metadata-driven rules editor and returning a software package to the clients. Other configurations of electronic devices may be used in other implementations (e.g., an implementation in which the client and the network protocol for the metadata-driven rules editor are implemented on a single one of electronic device 1300).

During operation, an instance of the software 1328 (illustrated as instance 1306 and referred to as a software instance; and in the more specific case of an application, as an application instance) is executed. In electronic devices that use compute virtualization, the set of one or more processor(s) 1322 typically execute software to instantiate a virtualization layer 1308 and one or more software container(s) 1304A-1304R (e.g., with operating system-level virtualization, the virtualization layer 1308 may represent a container engine (such as Docker Engine by Docker, Inc. or rkt in Container Linux by Red Hat, Inc.) running on top of (or integrated into) an operating system, and it allows for the creation of multiple software containers 1304A-1304R (representing separate user space instances and also called virtualization engines, virtual private servers, or jails) that may each be used to execute a set of one or more applications; with full virtualization, the virtualization layer 1308 represents a hypervisor (sometimes referred to as a virtual machine monitor (VMM)) or a hypervisor executing on top of a host operating system, and the software containers 1304A-1304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1328 is executed within the software container 1304A on the virtualization layer 1308. In electronic devices where compute virtualization is not used, the instance 1306 on top of a host operating system is executed on the "bare metal" electronic device 1300. The instantiation of the instance 1306, as well as the virtualization layer 1308 and software containers 1304A-1304R if implemented, are collectively referred to as software instance(s) 1302.

Alternative implementations of an electronic device may have numerous variations from that described above. For example, customized hardware and/or accelerators might also be used in an electronic device.

Example Environment

Figure 13B:
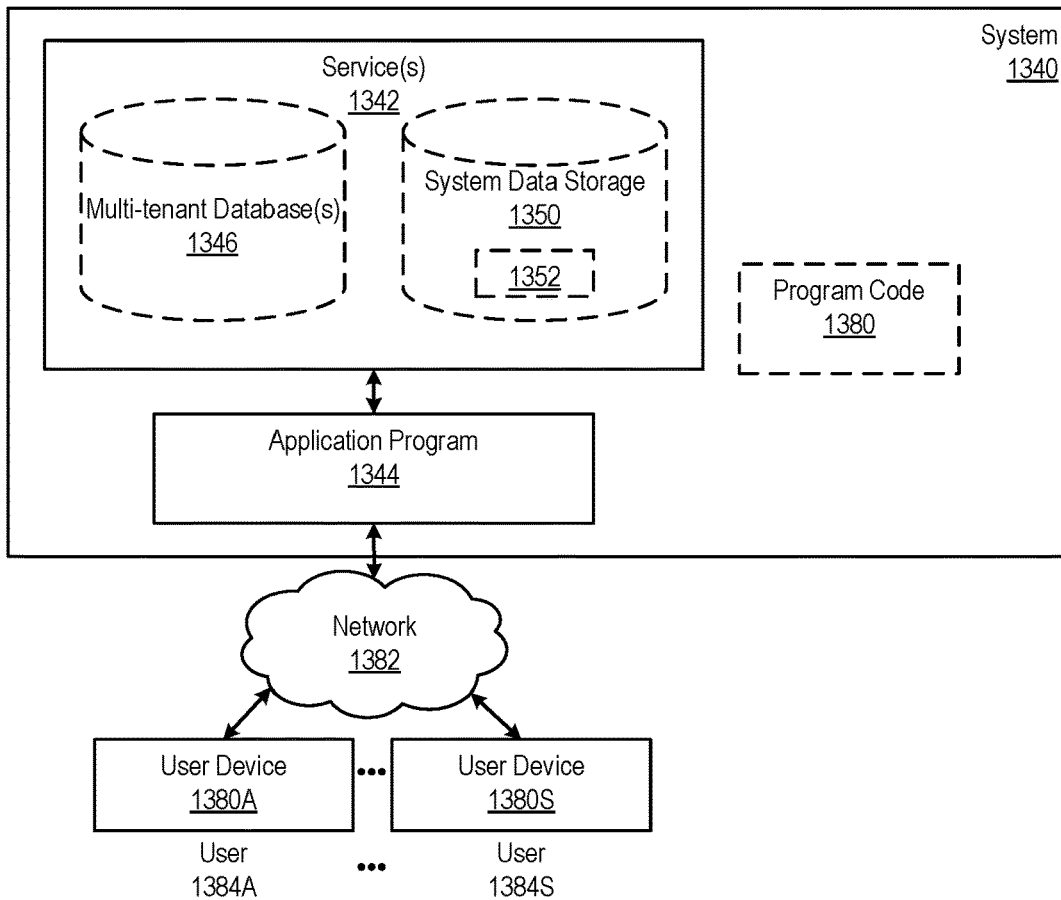
FIG. 13B is a block diagram of a deployment environment according to some example implementations.

FIG. 13B is a block diagram of a deployment environment according to some example implementations. A system 1340 includes hardware (e.g., a set of one or more server devices) and software to provide service(s) 1342, including the network protocol for the metadata-driven rules editor. In some implementations the system 1340 is in one or more datacenter(s). These datacenter(s) may be: 1) first party datacenter(s), which are datacenter(s) owned and/or operated by the same entity that provides and/or operates some or all of the software that provides the service(s) 1342; and/or 2) third-party datacenter(s), which are datacenter(s) owned and/or operated by one or more different entities than the entity that provides the service(s) 1342 (e.g., the different entities may host some or all of the software provided and/or operated by the entity that provides the service(s) 1342). For example, third-party datacenters may be owned and/or operated by entities providing public cloud services (e.g., Amazon.com, Inc. (Amazon Web Services), Google LLC (Google Cloud Platform (GCP)), Microsoft Corporation (Azure)).

The system 1340 is coupled to user devices 1380A-1380S over a network 1382. The service(s) 1342 may be on-demand services that are made available to one or more of the users 1384A-1384S working for one or more entities other than the entity which owns and/or operates the on-demand services (those users sometimes referred to as outside users) so that those entities need not be concerned with building and/or maintaining a system, but instead may make use of the service(s) 1342 when needed (e.g., when needed by the users 1384A-1384S). The service(s) 1342 may communicate with each other and/or with one or more of the user devices 1380A1380S via one or more APIs (e.g., a REST API). In some implementations, the user devices 1380A-1380S are operated by users 1384A-1384S, and each may be operated as a client device and/or a server device. In some implementations, one or more of the user devices 1380A-1380S are separate ones of the electronic device 1300 or include one or more features of the electronic device 1300.

In some implementations, the system 1340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1340 is a multi-tenant cloud computing architecture supporting multiple services, such as one or more of the following types of services:

Self-Healing Build Pipeline service 1342; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 1340 may include an application platform 1344 that enables PAAS for creating, managing, and executing one or more applications developed by the provider of the application platform 1344, users accessing the system 1340 via one or more of user devices 1380A-1380S, or third-party application developers accessing the system 1340 via one or more of user devices 1380A-1380S.

In some implementations, one or more of the service(s) 1342 may use one or more multi-tenant databases 1346, as well as system data storage 1350 for system data 1352 accessible to system 1340. In certain implementations, the system 1340 includes a set of one or more servers that are running on server electronic devices and that are configured to handle requests for any authorized user associated with any tenant (there is no server affinity for a user and/or tenant to a specific server). The user devices 1380A-1380S communicate with the server(s) of system 1340 to request and update tenant-level data and system-level data hosted by system 1340, and in response the system 1340 (e.g., one or more servers in system 1340) automatically may generate one or more Structured Query Language (SQL) statements (e.g., one or more SQL queries) that are designed to access the desired information from the multi-tenant database(s) 1346 and/or system data storage 1350.

In some implementations, the service(s) 1342 are implemented using virtual applications dynamically created at run time responsive to queries from the user devices 1380A-1380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1344 includes an application setup mechanism that supports application developers' creation and management of applications, which may be saved as metadata by save routines. Invocations to such applications, including the network protocol for the metadata-driven rules editor, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1340 and the user devices 1380A-1380S.

Each user device 1380A-1380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1340. For example, the user interface device can be used to access data and applications hosted by system 1340, and to perform searches on stored data, and otherwise allow one or more of users 1384A-1384S to interact with various GUI pages that may be presented to the one or more of users 1384A-1384S. User devices 1380A-1380S might communicate with system 1340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1380A-1380S might include an HTTP client, commonly referred to as a "browser," for sending and receiving HTTP messages to and from server(s) of system 1340, thus allowing users 1384A-1384S of the user devices 1380A-1380S to access, process and view information, pages and applications available to it from system 1340 over network 1382.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation.

Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method comprising:
   identifying, by an application programming interface (API) that is communicatively coupled with a rules engine, a plurality of rules, wherein respective rules of the plurality of rules are associated with at least one rule characteristic of a plurality of rule characteristics;
   identifying, by the API, a plurality of characteristics of a process request received from a customer, wherein the process request relates to a process that is to be executed based on one or more rules of the plurality of rules, wherein the plurality of characteristics comprises a first characteristic related to an entity type of the customer, a second characteristic related to a geographic location of the process request, a third characteristic related to a time period in which the process is to be executed, and a fourth characteristic related to a business domain applicable to the process request;
   identifying, by the API based on correlation of the plurality of characteristics of the process request with the plurality of rule characteristics, a subset of the plurality of rules less than the plurality of rules, wherein the subset contains only rules of the plurality of rules determined to be relevant to the process request;
   providing, by the API, one or more indications of rules in the subset of the plurality of rules to the rules engine; and
   executing, by the rules engine, the process based on the subset of the plurality of rules.

2. The method of claim 1, wherein the request relates to a process that is to be executed by the rules engine based on the subset of the plurality of rules.

3. The method of claim 1, wherein respective rule characteristics of the plurality of rule characteristics are implemented as metadata of a folder in which the rule is placed.

4. One or more non-transitory machine-readable storage media that provides instructions that, if executed by one or more processors, are configurable to cause the one or more processors to perform operations comprising:
   identifying, by an application programming interface (API) that is communicatively coupled with a rules engine, a plurality of rules, wherein respective rules of the plurality of rules are associated with at least one rule characteristic of a plurality of rule characteristics;
   identifying, by the API, a plurality of characteristics of a process request received from a customer, wherein the process request relates to a process that is to be executed based on one or more rules of the plurality of rules, wherein the plurality of characteristics comprises a first characteristic related to an entity type of the customer, a second characteristic related to a geographic location of the process request, a third characteristic related to a time period in which the process is to be executed, and a fourth characteristic related to a business domain applicable to the process request;
   identifying, by the API based on correlation of the plurality of characteristics of the process request with the plurality of rule characteristics, a subset of the plurality of rules less than the plurality of rules, wherein the subset contains only rules of the plurality of rules determined to be relevant to the process request;
   providing, by the API, one or more indications of rules in the subset of the plurality of rules to the rules engine; and
   executing, by the rules engine, the process based on the subset of the plurality of rules.

5. The one or more non-transitory machine-readable storage media of claim 4, wherein the request relates to a process that is to be executed by the rules engine based on the subset of the plurality of rules.

6. The one or more non-transitory machine-readable storage media of claim 4, wherein respective rule characteristics of the plurality of rule characteristics are implemented as metadata of a folder in which the rule is placed.

7. An apparatus comprising:
   one or more processors; and
   one or more non-transitory machine-readable storage media that provides instructions that, if executed by the one or more processors, are configurable to cause the one or more processors to:
      identify, by an application programming interface (API) that is communicatively coupled with a rules engine, a plurality of rules, wherein respective rules of the plurality of rules are associated with at least one rule characteristic of a plurality of rule characteristics;
      identify, by the API, a plurality of characteristics of a process request received from a customer, wherein the process request relates to a process that is to be executed based on one or more rules of the plurality of rules, wherein the plurality of characteristics comprises a first characteristic related to an entity type of the customer, a second characteristic related to a geographic location of the process request, a third characteristic related to a time period in which the process is to be executed, and a fourth characteristic related to a business domain applicable to the process request;

identify, by the API based on correlation of the plurality of characteristics of the process request with the plurality of rule characteristics, a subset of the plurality of rules less than the plurality of rules, wherein the subset contains only rules of the plurality of rules determined to be relevant to the process request;

provide, by the API, one or more indications of rules in the subset of the plurality of rules to the rules engine; and execute, by the rules engine, the process based on the subset of the plurality of rules.

8. The apparatus of claim 7, wherein the request relates to a process that is to be executed by the rules engine based on the subset of the plurality of rules.

9. The apparatus of claim 7, wherein respective rule characteristics of the plurality of rule characteristics are implemented as metadata of a folder in which the rule is placed.

\* \* \* \* \*